US010323119B2

(12) United States Patent
Webster et al.

(10) Patent No.: US 10,323,119 B2
(45) Date of Patent: Jun. 18, 2019

(54) BIO-BASED RESINS WITH HIGH CONTENT OF ETHYLENICALLY UNSATURATED FUNCTIONAL GROUPS AND THERMOSETS THEREOF

(71) Applicant: NDSU RESEARCH FOUNDATION, Fargo, ND (US)

(72) Inventors: Dean C. Webster, Fargo, ND (US); Lindsey Bultema, Casselton, ND (US); Jingling Yan, Changchun (CN)

(73) Assignee: NDSU RESEARCH FOUNDATION, Fargo, ND (US)

(*) Notice: Subject to any disclaimer, the term of this patent is extended or adjusted under 35 U.S.C. 154(b) by 242 days.

(21) Appl. No.: 15/034,312

(22) PCT Filed: Nov. 7, 2014

(86) PCT No.: PCT/US2014/064546
§ 371 (c)(1),
(2) Date: May 4, 2016

(87) PCT Pub. No.: WO2015/070018
PCT Pub. Date: May 14, 2015

(65) Prior Publication Data
US 2016/0280842 A1  Sep. 29, 2016
US 2018/0251591 A9  Sep. 6, 2018

Related U.S. Application Data

(63) Continuation-in-part of application No. 13/577,043, filed as application No. PCT/US2011/023753 on Feb. 4, 2011, now Pat. No. 9,096,773.
(Continued)

(51) Int. Cl.
*C09D 147/00* (2006.01)
*C08G 59/17* (2006.01)
(Continued)

(52) U.S. Cl.
CPC ........ *C08G 59/1466* (2013.01); *C08F 290/04* (2013.01); *C08F 290/064* (2013.01);
(Continued)

(58) Field of Classification Search
CPC .................... C09D 147/00; C08G 59/1466
(Continued)

(56) References Cited

U.S. PATENT DOCUMENTS 3,125,592 A * 3/1964 Nevin .................. C07C 67/26
526/318
3,209,015 A   9/1965 Wilbur
(Continued)

FOREIGN PATENT DOCUMENTS

WO  2011/097484 A1  8/2011
WO  WO 2011/097484 A1 * 8/2011 ............. C08G 65/02

OTHER PUBLICATIONS

International Search Report and Written Opinion in corresponding International Application No. PCT/US2014/064546, dated Jan. 14, 2015.
(Continued)

*Primary Examiner* — Jane L Stanley
(74) *Attorney, Agent, or Firm* — J.A. Lindeman & Co. PLLC; Aaron Raphael; Jeffrey Lindeman

(57) ABSTRACT

The invention provides polyfunctional bio-based methacrylate oligomers, which are synthesized via the ring-opening reaction between at least one ethylenically unsaturated acid selected from methacrylic acid, acrylic acid, and crotonic acid, and a polyfunctional bio-based epoxy resin, such as epoxidized sucrose soyate. The extent of reaction may be varied to generate a family of methacrylate oligomers with differing degrees of methacrylation. These methacrylate oligomers can optionally be mixed with a reactive diluent, such as styrene, and cured using, for example, a thermally- (Continued)

activated free radical initiator to form a thermoset polymer with high modulus. The thermosets can be used to form composites, adhesives, coatings, and dental restorative materials. Methods of making the methacrylate oligomers are disclosed as are coating compositions and coated objects, such as dental restorative materials, using the methacrylate oligomers.

29 Claims, 17 Drawing Sheets

Related U.S. Application Data

(60) Provisional application No. 61/901,223, filed on Nov. 7, 2013, provisional application No. 61/435,338, filed on Jan. 23, 2011, provisional application No. 61/355,453, filed on Jun. 16, 2010, provisional application No. 61/355,487, filed on Jun. 16, 2010, provisional application No. 61/302,124, filed on Feb. 6, 2010.

(51) Int. Cl.
*C08F 290/06* (2006.01)
*C08G 65/22* (2006.01)
*C08G 65/26* (2006.01)
*C08F 290/04* (2006.01)
*C08G 59/32* (2006.01)

(52) U.S. Cl.
CPC ......... *C08G 59/3236* (2013.01); *C08G 65/22* (2013.01); *C08G 65/2615* (2013.01); *C09D 147/00* (2013.01)

(58) Field of Classification Search
USPC .................................................. 524/600, 599
See application file for complete search history.

(56) References Cited

U.S. PATENT DOCUMENTS

| | | | |
|---|---|---|---|
| 3,223,657 A | 12/1965 | Weisfeld et al. | |
| 3,236,795 A | 2/1966 | Graver | |
| 3,248,404 A | 4/1966 | Werdelmann et al. | |
| 3,792,041 A | 2/1974 | Yamagishi et al. | |
| 3,870,664 A | 3/1975 | Faulkner | |
| 3,876,518 A * | 4/1975 | Borden | C08G 59/1466 522/100 |
| 4,117,029 A | 9/1978 | Kitano | |
| 4,517,360 A | 5/1985 | Volpenhein | |
| 4,663,072 A | 5/1987 | Cheung | |
| 4,940,648 A | 7/1990 | Geiger | |
| 4,962,179 A * | 10/1990 | Corley | C08G 59/027 528/103 |
| 5,318,808 A | 6/1994 | Crivello et al. | |
| 5,646,226 A | 7/1997 | Sachinala et al. | |
| 5,707,440 A | 1/1998 | Hengchang et al. | |
| 6,077,879 A | 6/2000 | Ohtsuki et al. | |
| 6,303,777 B1 | 10/2001 | Kao et al. | |
| 6,518,226 B2 | 2/2003 | Volker et al. | |
| 9,765,233 B2 * | 9/2017 | Webster | C09D 133/10 |
| 2002/0013396 A1 | 1/2002 | Benecke et al. | |
| 2003/0229224 A1 | 12/2003 | Schaefer et al. | |
| 2006/0020062 A1 | 1/2006 | Bloom | |
| 2007/0232816 A1 | 10/2007 | Soi et al. | |
| 2009/0005508 A1 | 1/2009 | Bloom | |
| 2010/0009104 A1 | 1/2010 | Greelis et al. | |
| 2010/0261806 A1 * | 10/2010 | Koch | C09J 133/068 522/170 |
| 2010/0292415 A1 * | 11/2010 | Reynolds | C08G 59/24 525/533 |
| 2011/0073253 A1 | 3/2011 | Clausi et al. | |
| 2013/0136931 A1 | 5/2013 | James et al. | |
| 2013/0203935 A1 | 8/2013 | Thiele et al. | |
| 2013/0261251 A1 | 10/2013 | Webster et al. | |
| 2014/0336301 A1 * | 11/2014 | Webster | C08G 59/027 522/170 |
| 2016/0312060 A1 * | 10/2016 | Webster | C09D 175/12 |
| 2017/0022386 A1 * | 1/2017 | Webster | C08F 222/02 |

OTHER PUBLICATIONS

International Preliminary Report on Patentability in corresponding International Application No. PCT/US2014/064546, dated May 19, 2016.
International Search Report and Written Opinion for PCT International Application No. PCT/US2011/023753, dated Apr. 6, 2011.
International Search Report and Written Opinion in PCT Application No. PCT/US2014/066073 dated Feb. 23, 2015.
Busnel et al.: "Improvement of the Processing of Polyurethane Reinforced by Glass and Cellulosic Fibres," Thermosets 2011—From Monomers to Components, Proceedings of the 2nd International Conference on Thermosets, Sep. 21, 2011, Jan. 5, 2011. [retrieved on Jan. 12, 2015]. Retrieved from the Internet <URL: http://nparc.cisti-icist.nrc-cnrc.gc.ca/npsi/ctrl?action=rtdoc&an=18929686&lang=en>.
Hosseini et al.: "Utilization of Flax Fibers and Glass Fibers in a Bio-Based Resin," The 19th International Conference on Composite Materials 2013, 565-572, Jul. 20-Aug. 2, 2013. [retrieved on Jan. 12, 2015]. Retrieved from the Internet. <URL: http://www.researchgate.net/publication/266910697_Utilization_of_flax_fibers_and_glass_fibers_in_a_bio-based_resin>.

* cited by examiner

BIO-BASED RESINS WITH HIGH CONTENT OF ETHYLENICALLY UNSATURATED FUNCTIONAL GROUPS AND THERMOSETS THEREOF

CROSS-REFERENCE TO RELATED APPLICATIONS

This application is a National Stage application of International PCT application PCT/US2014/064546, filed Nov. 7, 2014, which claims the benefit of U.S. Provisional App. No 61/901,223, filed Nov. 7, 2013, all of which are incorporated herein by reference. This application is also a continuation-in-part of U.S. patent application Ser. No. 13/577,043, filed Oct. 31, 2012, now U.S. Pat. No. 9,096,773, issued Aug. 4, 2015, which is a National Stage application of International PCT application PCT/US2011/023753, filed Feb. 4, 2011, which claims the benefit of U.S. Provisional App. No. 61/302,124, filed Feb. 6, 2010, U.S. Provisional App. No. 61/355,453, filed Jun. 16, 2010, U.S. Provisional App. No. 61/355,487, filed Jun. 16, 2010, and U.S. Provisional App. No. 61/435,338, filed Jan. 23, 2011, all of which are incorporated herein by reference.

BACKGROUND

Thermosetting polymers and composites have been widely used in modern industry because of their low density, good mechanical properties, low cost, dimensional stability, and so on. Important monomers and oligomers for thermosets include unsaturated polyester, epoxy resin, vinyl ester, phenol-formaldehyde resin, melamine resin, etc. Traditionally, most of these resins have been synthesized using petroleum-based chemicals as the raw materials. However, due to the foreseeable limit of fossil feedstocks and the increasing environmental concerns, the polymer and composites industry is suffering from potential increasing cost and environmental regulations. Therefore, much effort has been devoted lately to develop polymers and composites from bio-renewable raw materials. See Wool et al. *Bio-based Polymers and Composites*, Elsevier, Amsterdam (2005); Belgacem et al., *Monomers, Polymers, and Composites from Renewable Resources*, Elsevier, Amsterdam (2008); Raquez et al. *Prog. Polym. Sci.* 35:487-509 (2010). The fluctuating price of petroleum-based products and stricter environmental rules and regulations increases the demand for bio-based products. Compared to petroleum-based products, bio-based products are environmentally friendly, biodegradable, sustainable, and versatile, in use. See Deka et al., *Progress in Organic Coatings* 66:192-192 (2009). In 2004, the world production from major oils totaled 380 million metric tons. Production has continued to rise at a rate of 3-4% per year with soybean oil the major oil produced. See Behera et al., *Journal of Applied Polymer Science* 109:2583-2590 (2008).

Plant oils are one of the most important bio-renewable chemical feedstocks for the polymer industry because of their high annual production, high availability, low toxicity, relatively low cost, and biodegradability. Plant oils and their derivatives have been widely used for the production of paints and coatings since the development of drying oil resins, taking advantage of the autoxidation crosslinking of the double bonds in the fatty acid chains. See Meier et al., *Chem. Soc. Rev.* 36:1788-1802 (2007); Xia et al., *Green Chem.* 13:1983-1909 (2010). During the last decade, a variety of plant oil-based polymers have been developed via free radical or cationic homo-polymerization, as well as copolymerization with petroleum-based monomers, such as styrene and divinylbenzene. See Lu et al., *ChemSusChem* 2:136-147 (2009); Li et at, *Biomacromolecules* 4:1018-1025 (2.003); Kunclu et at, *Biomacromolecules* 6:797-806 (2005); Henna et al., *J. Appl. Polym. Sci.* 104:979-985 (2007); Valverde et al., *J. Appl. Polym. Sci.* 107:423-430 (2008); Andjelkovic et. al., *Polymer* 46:9674-9685 (2005); Andjelkovic et al., *Biomacromolecules* 7:927-936 (2006); Lu et al., *Biomocromolecules* 7:2692-2700 (2006). Bio-based vegetable oils (e.g., soybean oil) contain triglycerides that are composed of three unsaturated fatty acid chains joined at a glycerol junction. See Fu et al., *Journal of Applied Polymer Science* 117:2220-2225 (2010). However, due to the relatively low reactivity of the double bonds in the fatty acid chain, some chemical modifications are usually needed to introduce reactive functional groups having higher reactivity. A widely explored method for the modification of plant oils involves the conversion of the double bonds to epoxy groups by using peracids and hydrogen peroxides. For example, the structure of epoxidized sucrose soyate is shown in FIG. 1. With the epoxidation polymerization occurs quickly with highly cross linked networks. See Behera et al., *Journal of Applied Polymer Science* 109:2583-2590 (2008); Kolot et al., *Journal of Applied Polymer Science* 91:3835-3843 (2003). Epoxidized plant oils have been utilized for coatings and composites by using conventional epoxy curing agents, such as amine and anhydride. However, the internal epoxy groups in epoxidized plant oils are much less reactive than the terminal epoxy groups in benchmark materials, for example bisphenol-A epoxy. Therefore, epoxidized plant oils have been further modified via the ring-open reaction of epoxy with unsaturated acids or alcohols to produce (meth)acrylated plant oils or plant oil-based polyols. These derivatives have been widely used to generate thermosets by free radical cure or hydroxyl-isocyanate reactions. See Wu et al., *Polym. Int.* 60:571-575 (2011); Lu al., *Polymer* 46:71-80 (2005); La Scala et al., *Polymer* 46:61-69 (2005); Can et al., *J. Appl. Polym. Sci,* 81:69-77 (2001); Pfister et al., *ChemSusChem* 4:703-717 (2011); Desroches et al., *Polym. Rev.* 52:38-79 (2012); Lu et al., *Biomacromolecules* 8:3108-3114 (2007); Lu et at, *ChemSusChem* 3:329-333 (2010); *Polym. Rev.* 48:109-155 (2008). Besides epoxidization, plant oils have also been modified by hydroformylation (see Petrovic et al., *Polym. Int.* 57:275-281 (2008); Petrovic et al., *Eur. J. Lipid Sci. Technol.* 112:97-102 (2010)) and thiol-ene reactions. See Meier et al., *Macromol. Rapid commun.* 31:1822-1826 (2010); Turunc et al., *Green Chem.* 13:314-320 (2011); Wu et al., *ChemSusChem* 4:1135-1142 (2011).

The biggest obstacle in the application of plant oils for the generation of polymers is the flexibility of the fatty acid chain, which leads to low glass transition temperature ($T_g$) and low mechanical properties such as modulus and hardness. Thus, plant oils cannot be used by themselves as structural and engineering materials. To overcome these limitations, petroleum-based monomers (for example styrene) are usually introduced to reinforce plant oil-based polymers, but the bio-renewable content is sacrificed to achieve the desired material properties in this approach. See Li et al., *Biomocromolecules* 4:1018-1025 (2003); Khot et al., *J. Appl. Polym. Sci.* 82:703-72.3 (2011).

Sucrose is a bio-renewable polyol that is naturally present in a variety of plants. Sucrose ester is a vegetable oil composed of sucrose and fatty acids that is frequently used as a bio-based curable material for decades. See Jinli et al., *Chinese Journal of Chemical Engineering* 17:1033-1037 (2009). The fatty esters of sucrose were first explored as a coating resin in 1960's. See Bobalek et al., *Official Digest*

33:453-468 (1961); Walsh et al., *Div. Org. Coatings Plastic Chem.* 21:125-148 (1961). However, a high degree of substitution of sucrose with fatty acids had not been achieved until an efficient process was developed by Procter & Gamble (P&G) Chemicals in 2002. See U.S. Pat. Nos. 6,995,232; 6,620,952; 6,887,947. In spite of a relatively high degree of substitution (average of 7.7 fatty acid chains per molecule) and moderate molecular weight (around 2,400 g/mol), sucrose esters of fatty acids have low viscosity (300-400 mPa·s) due to their compact architectures. Highly substituted sucrose esters of fatty acids (SEFAs) have been successfully commercialized under the brand Sefose®, and utilized as a diluent in alkyd resins by CCP. Furthermore, SEF As are a highly tunable platform such that a variety of derivatives and formulations with different properties and application can be developed, since many of the modification approaches for plant oils are applicable to sucrose esters.

Vegetable oils have been modified using maleinization, epoxidation, acrylation, and hydroxomethylation. See Fu et al., *Journal of Applied Polymer Science* 117:2220-2225 (2010). Epoxidation and acrylation are the most common forms of modification of soybean oils with acrylated soybean oils (ASO) being the most prevalent. See Bunker et a *Journal of Oil and Colour Chemists's Association* 83:460 (2000). Soybean oils have a wide distribution of functional groups, 0-9 polymerizable groups per molecule. Thus, allowing for substances to react readily to them. The double bonds and highly reactive end groups allows for free radical polymerization to occur. See Fu et al., *Journal of Applied Polymer Science* 117:2220-2225 (2010); Behera et al., *Journal of Applied Polymer Science* 109:2583-2590 (2008). Acrylated soybean oils (ASO) are used to form solvent-free curing of films, adhesives, coatings, inks, and varnishes. Acrylation of ESO will lead to great improvement of photoactivity because of the short time it takes to form crosslinks under ultraviolet radiation. See Pelletier et al., *Journal of Applied Polymer Science* 99:3218-3221 (2005).

Recently, Pan et al. reported the synthesis of a series of thermosets based on SEFAs. Epoxidized sucrose esters of fatty acids (ESEFAs) were prepared via epoxidization, and cured using cyclic anhydrides. See Pan et al., *Green Chem.* 13:965-975 (2011); Pan et al., *Biomacromolecules* 12;2416-2428 (2011); Pan et al., *Macro. Rapid Comm.* 32:1324-1330 (2011).

ESEFAs may be further derivatized by the reaction of epoxy with acid or alcohol, which can generate bio-based polyols for the application of polyurethane coatings and composites. See Pan et al., *ChemSusChem* 5:419-429 (2012). Compared to their counterparts based on triglyceride oils, thermosets based on SEFAs showed much higher $T_g$s and mechanical properties, which can be attributed to the high functionality of SEFA-based resins and the rigidity of the sucrose core. See Pan et al., *Prog. Ord. Coat.* 73:344-354 (2012); Pan et al., *Green Chem.* 13:965-975 (2011); Pan et al., *Biomacromolecules* 12:2416-2428 (2011); Pan et al. *Macro. Rapid Comm.* 32:13244330 (2011); Pan et al. *ChemSusChem* 5:419-429 (2012); Van et al., *Polym. Int.* 61:602-608 (2012); Nelson et al., *J. Renew. Mater.,* 1:141-153 (2013); Nelson et al., *J. Coat. Technol. Res.* 10:757-767 (2013); Nelson et al., *J. Coat. Technol. Res.* 10:589-600 (2013).

With increased environmental regulations and the depleting petroleum reserves, a bio-based resin that has comparative properties to conventional dental restoration materials is also necessary. See Deka et al., *Progress in Organic Coatings* 66:192492 (2009). Improvement in ultraviolet light initiation has advanced the formulation of dental resin composites. See Furuse et al., *Dental Materials* 27:497-506 (2011). The three leading restorative materials are ethyl methacrylates, methyl methacrylates, and bis-acrylate resin composites. For the past 40 years bisphenol-A diglycidylether methacrylate (bis-GMA) has been the main composite system. What makes bis-GMA stand out among other composites is its high viscosity and rigid central structure, which reduces its ability to rotate and participate in the polymerization process. See Yap et al., *Dental Materials* 20:370-376 (2004); Prakki et al., *Dental Materials* 23:1199-1204 (2007). Because of such high viscosity, bis-GMA is normally diluted with triethyleneglycol dimethacrylate (JEGDMA). FIG. 2 shows the structures of bis-GMA and TEGDMA. TEGDMA works not only to reduce viscosity of bis-GMA, but also to increase the methacrylate double bond conversions. See Mahmoodian et al., *Dental Materials* 24:514-521 (2008).

Because the viscosity of bis-GMA is so high, handling it is hard and unfavorable. See Mahrnoodian et al., *Dental Materials* 24:514-521 (2008). In addition, the safety of bisphenol-A (BPA) has come under speculation, causing people to be unsure about using a product that contains BPA, including dental composites. See Kovacic, *Medical Hypotheses* 75:1-4 (2010).

The invention provides the synthesis of methacrylated epoxidized sucrose soyate (MAESS) oligomers. MAESS oligomers may be formulated into thermosets and cured via a free radical mechanism using styrene, for example, as the reactive diluent. The bio-based thermosets have beneficial thermal and mechanical properties. In addition, the invention relates to a vegetable oil resin that compares favorably to the properties of BPA, and is an appropriate bio-based substitute for the currently used petroleum-based dental resins.

SUMMARY OF THE INVENTION

In one embodiment, the invention relates to polyfunctional bio-based methacrylated oligomers synthesized via the ring-opening reaction between at least one ethylenically unsaturated acid selected from methacrylic acid, acrylic acid, and crotonic acid, and polyfunctional bio-based epoxy resins. The term "polyfunctional bio-based methacrylate oligomer(s)" is used herein to designate a polyfunctional bio-based epoxy resin esterified, also termed "methacrylated", by at least one of the ethylenically unsaturated acids. Polyfunctional bio-based methacrylate oligomers of the invention may have different degrees of esterification or "methacrylation." For example, methacrylated epoxidized sucrose soyate (MAESS) oligomers having different degrees of methacrylation may be prepared by the acid-epoxide reaction using epoxidized sucrose soyate and methacrylic acid as raw materials, and AMC-2 as the catalyst. The methacrylate oligomers of the invention may be characterized using gel permeation chromatography (GPC), Fourier transform infrared spectroscopy (FTIR), proton nuclear magnetic resonance ($^1$H-NMR), acid number titration, and viscosity measurements.

In another embodiment, the invention relates to a curable coating composition comprising at least one polyfunctional bio-based methacrylate oligomer of the invention, at least one optional diluent, and at least one optional initiator. In another embodiment, the curable coating composition of the invention may be coated onto a substrate and cured using techniques known in the art. The substrate can be any common substrate such as paper, polyester films such as polyethylene and polypropylene, metals such as aluminum and steel, glass, urethane elastomers, primed (painted) substrates, and the like. The curable coating composition of the invention may be cured thermally or photochemically.

In another embodiment, the invention relates to a method of making a curable coating composition of the invention comprising the step of mixing at least one polyfunctional bio-based methacrylate oligomer of the invention with at least one optional diluent and at least one optional initiator.

In another embodiment, the invention relates to bin-based thermosets produced from free radical curing of these polyfunctional bio-based methacrylate oligomers with a diluent, such as, for example, styrene. The polyfunctional bio-based methacrylate oligomers of the invention could form homogeneous mixtures with styrene over a broad range of ratios. MAESS, for example, may be mixed with styrene and formulated into bio-based thermosets by free radical polymerization using peroxides, for example, as the initiators, The extent of cure may be confirmed by FTIR and gel content determinations. The properties of the thermosets of the invention may be evaluated using tensile testing, dynamic mechanical analysis (DMA), and thermogravimetric analysis (TGA).

In another embodiment, the invention relates to an article of manufacture comprising a thermoset coating of the invention and a method of making such article.

Methacrylate epoxidized soybean oil (MAESBO), thermosets based on MAESS showed much higher glass transition temperature ($T_g$) and better mechanical properties than reference counterparts, which can be attributed to the unique combination of high methacrylate functionality and the rigid sucrose core in the MAESS oligomers.

In another embodiment, the invention relates to methacrylated epoxidized sucrose soyate synthesized by combining epoxidized sucrose soyate, methacrylic acid, hydroquinone, and AMC-2. Epoxidized sucrose soyate may then be methacrylated at various percent methacrylations, including, for example, 25% (MAESS_25), 50% (MAESS_50), 75% (MAESS_75), and 90% (MAESS_90). The methacrylated epoxidized sucrose soyate of the invention was characterized by infrared spectroscopy and viscosity measurements. UV-curable coatings of MAESS_25, MAESS_50, MAESS_75, MAESS_90, and bis-GMA as the control material were done with triethyleneglycol dimethacrylate (TEGDMA) as the reactive diluent. Coating performance testing was done on the cured materials. MAESS 75 had the most comparative coating characteristics to the control. Overall, all coatings had high crosslinking, which caused hard and brittle coatings.

BRIEF DESCRIPTIONS OF THE FIGURES

Figure 6:
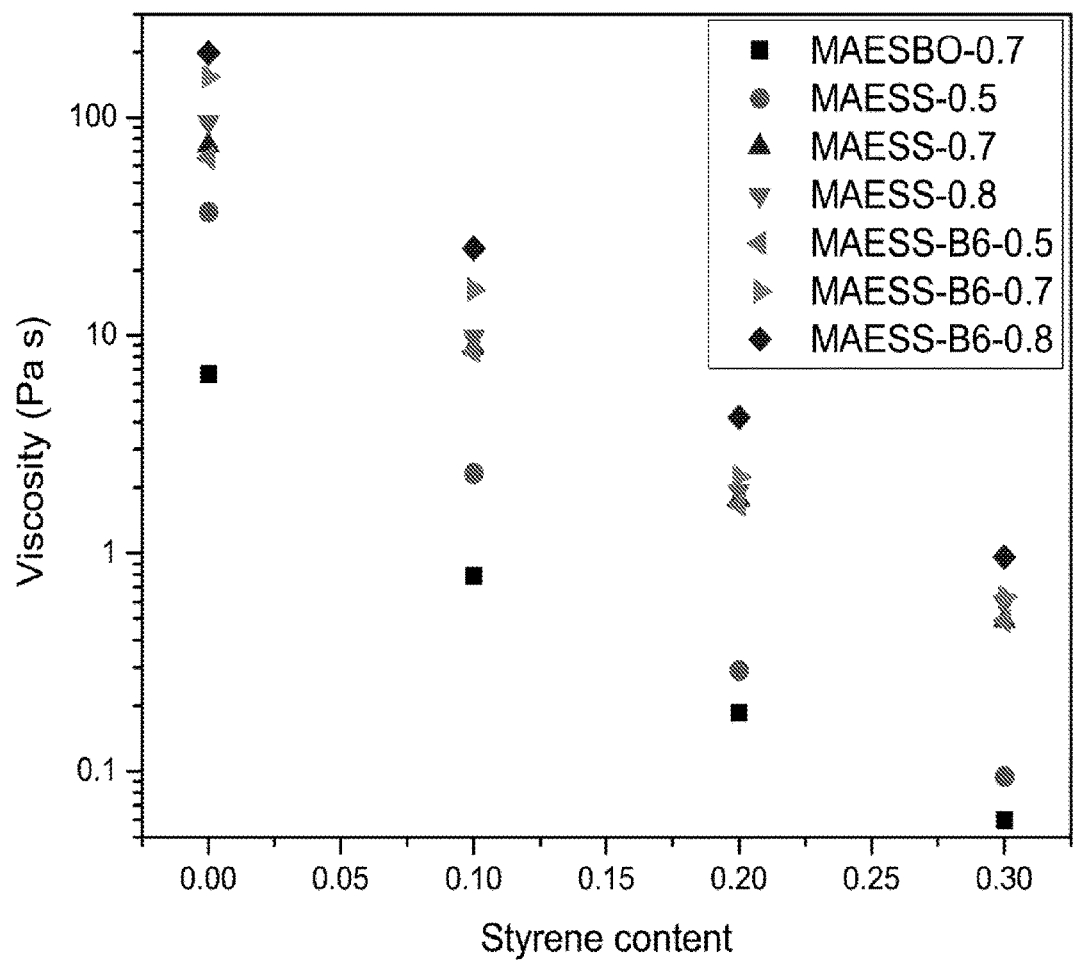

FIG. 6 provides a graph of viscosity as a function of styrene content for methacrylated epoxidized sucrose soyate oligomers.

Figure 7A:
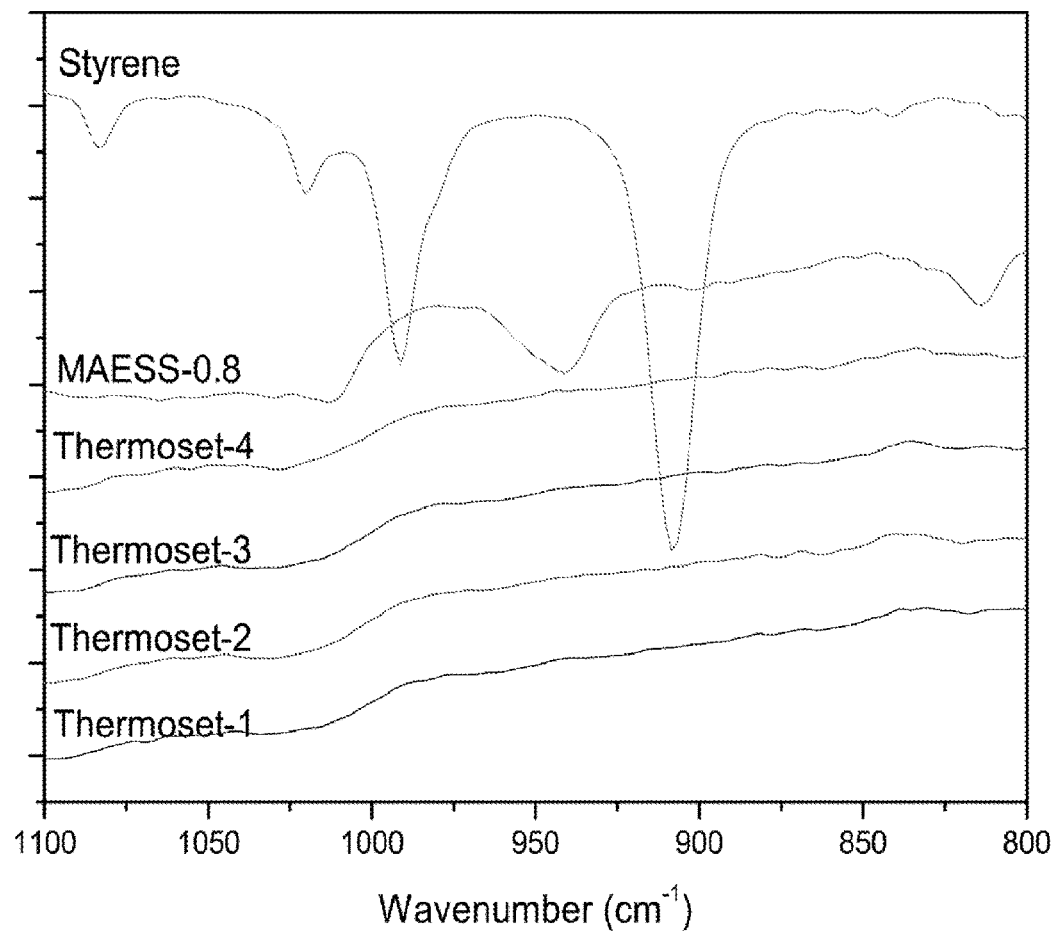

FIG. 7a depicts FT-IR spectra of MAESS-0.8, styrene, and thermosets based on them (800-1,100 cm$^{-1}$) (Thermoset-1: 100% MAESS-0.8; Thermoset-2: 90% MAESS-0.8/10% styrene; Thermoset-3: 80% MAESS-0.8/20% styrene; Thermoset-4: 70% MAESS-0.8/30% styrene).

Figure 7B:
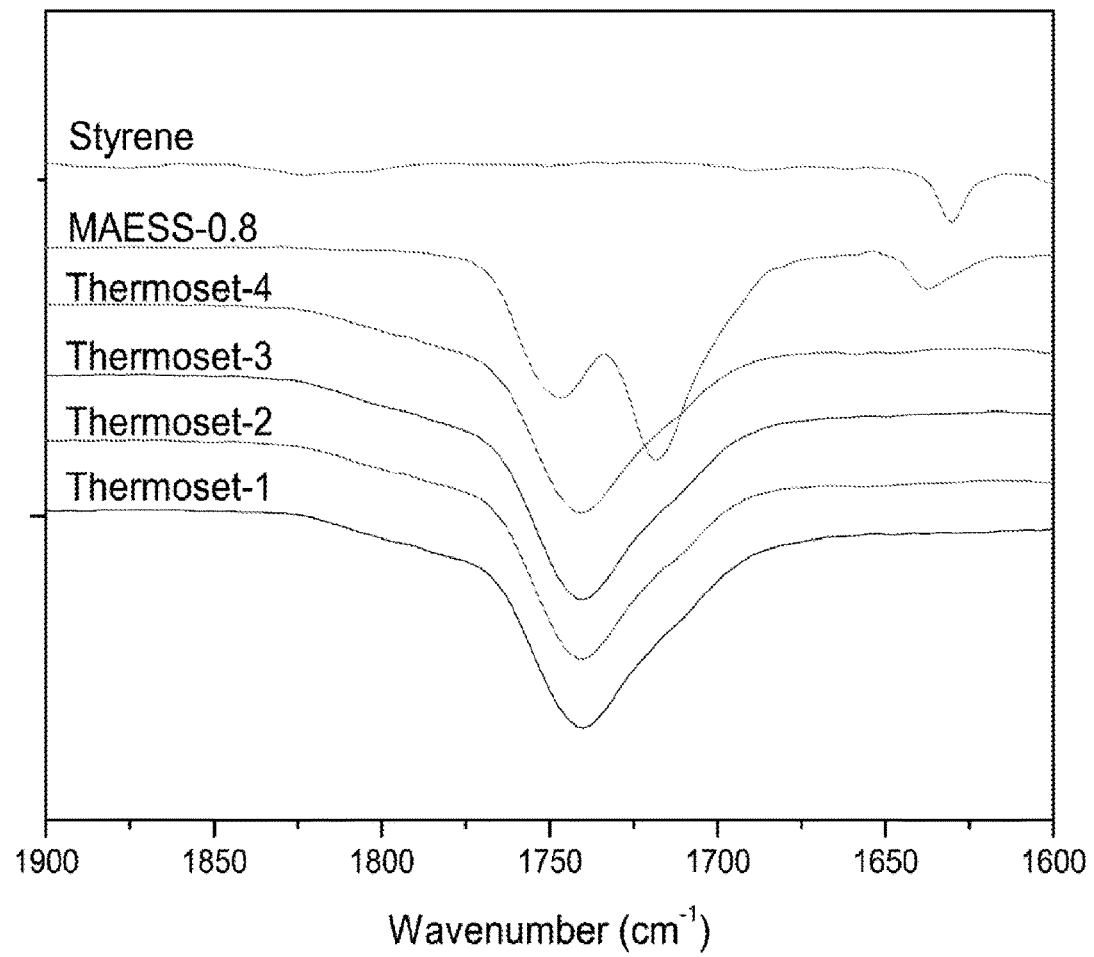

FIG. 7b depicts FT-IR spectra of MAESS-0.8, styrene, and thermosets based on them (1,600-1,800 cm$^{-1}$) (Thermoset-1: 100% MAESS-0.8; Thermoset-2: 90% MAESS-0.8/10% styrene; Thermoset-3: 80% MAESS-0.8/20% styrene; Thermoset-4: 70% MAESS-0.8/30% styrene).

Figure 8:
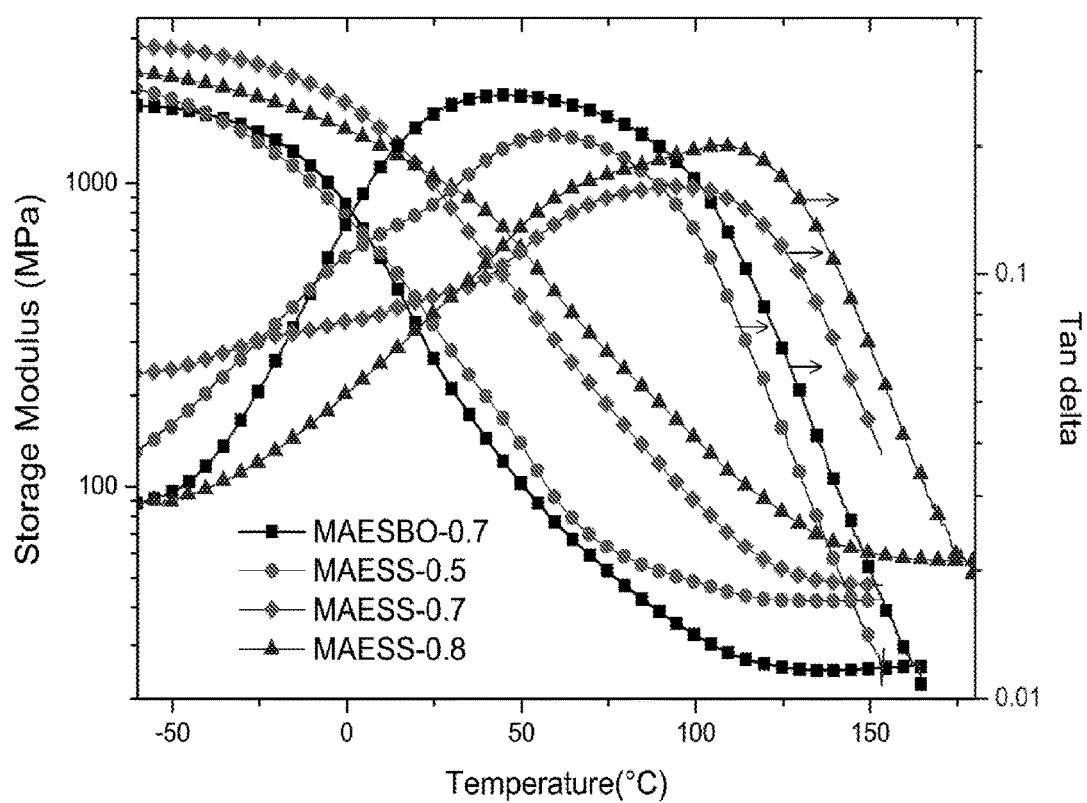

FIG. 8 provides a graph of dynamic mechanical thermal analysis curves of thermosets based on methacrylated epoxidized soybean oil (MAESBO-0.7) and methacrylated epoxidized sucrose soyate (MAESS-0.5, MAESS-0.7, and MAESS-0.8) (no styrene diluent).

Figure 9:
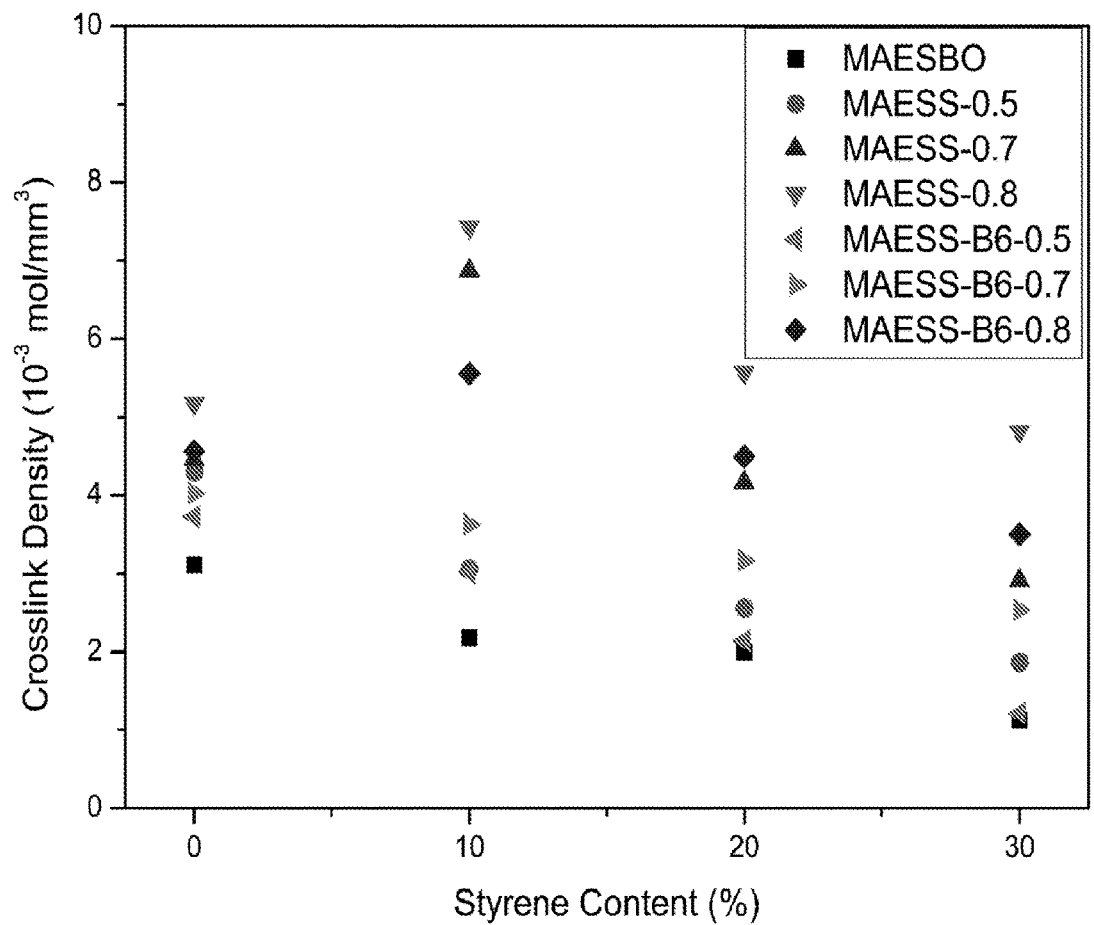

FIG. 9 provides a graph of crosslink density as a func i of styrene content for thermosets based on MAESBO and MAESS.

Figure 10:
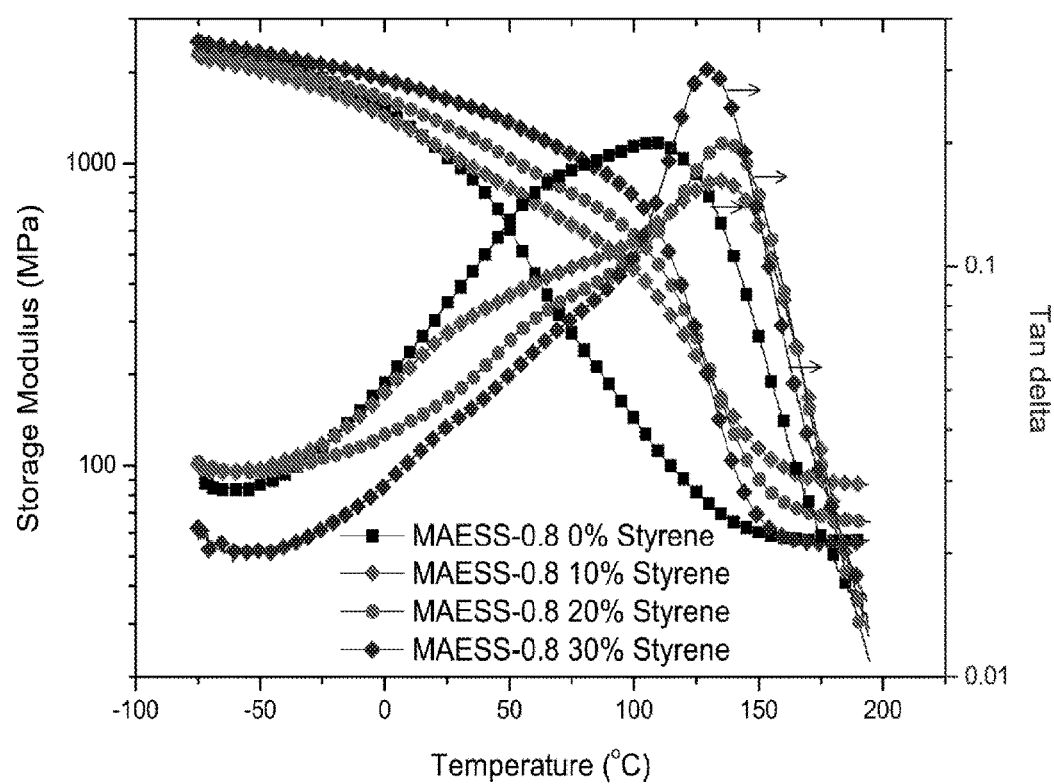

FIG. 10 provides a graph of dynamic mechanical thermal analysis curves of thermosets based on MAESS-0.8 and styrene.

Figure 11:
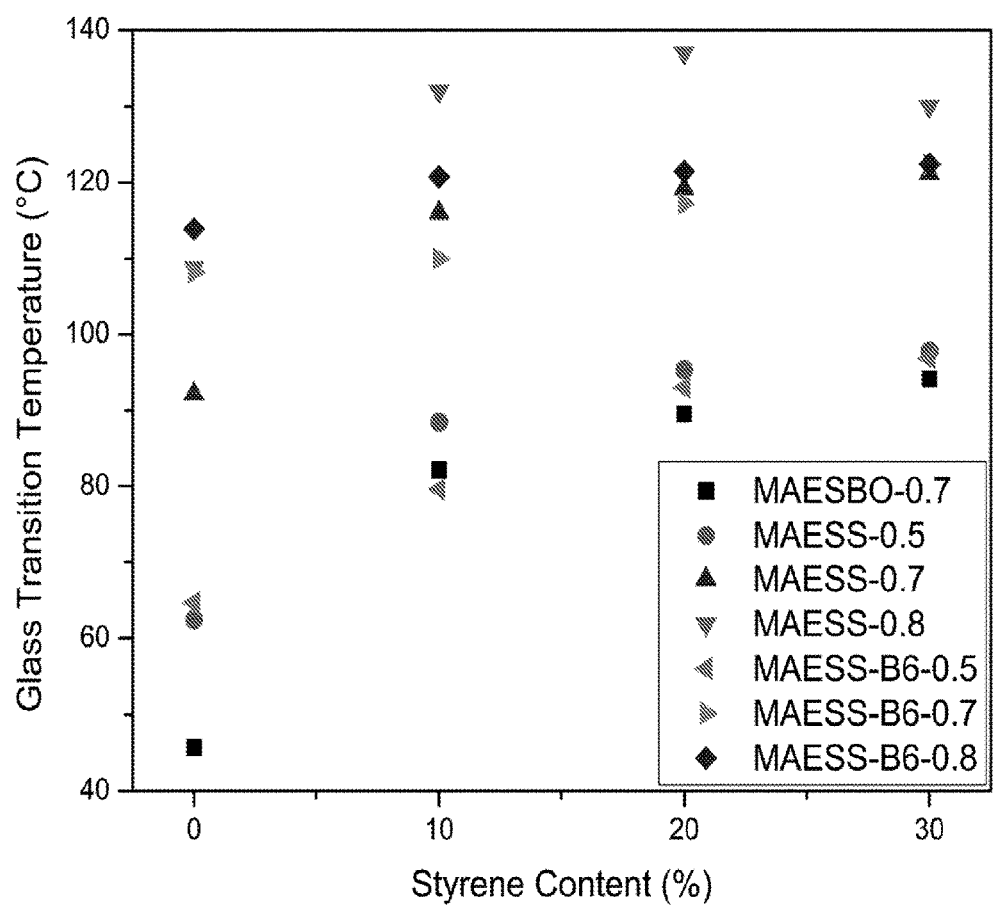

FIG. 11 provides a graph of glass transition temperatures as a function of styrene content for thermosets based on MAESS and MAESBO.

Figure 12A:
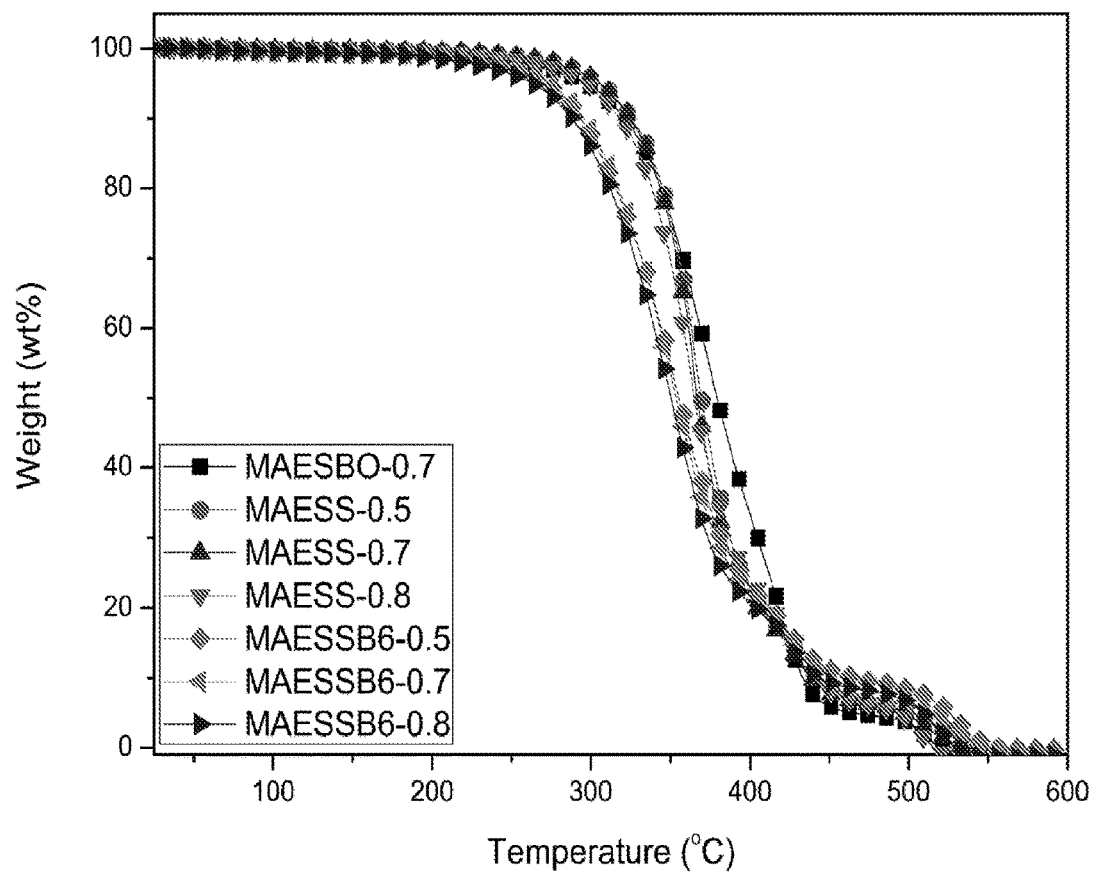

FIG. 12a provides a graph of TGA curves of homopolymers based on methacrylated epoxidized sucrose soyate.

Figure 12B:
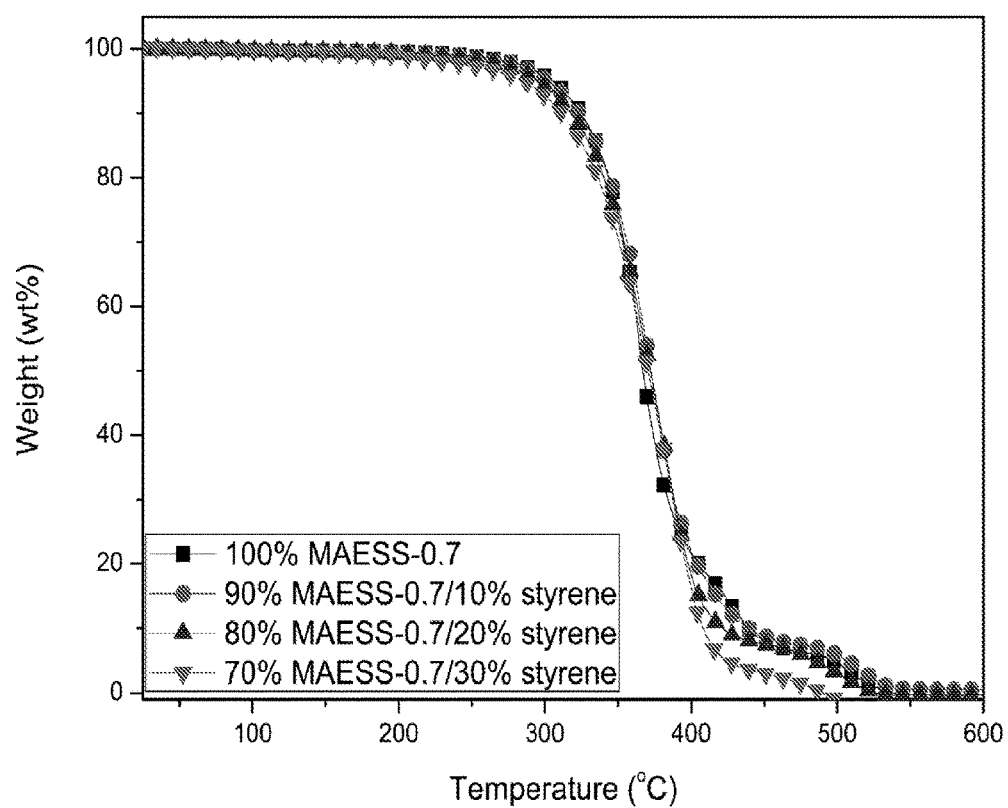

FIG. 12b provides a graph of TGA curves of thermosets based on MAESS-0.7 and styrene.

Figure 13:
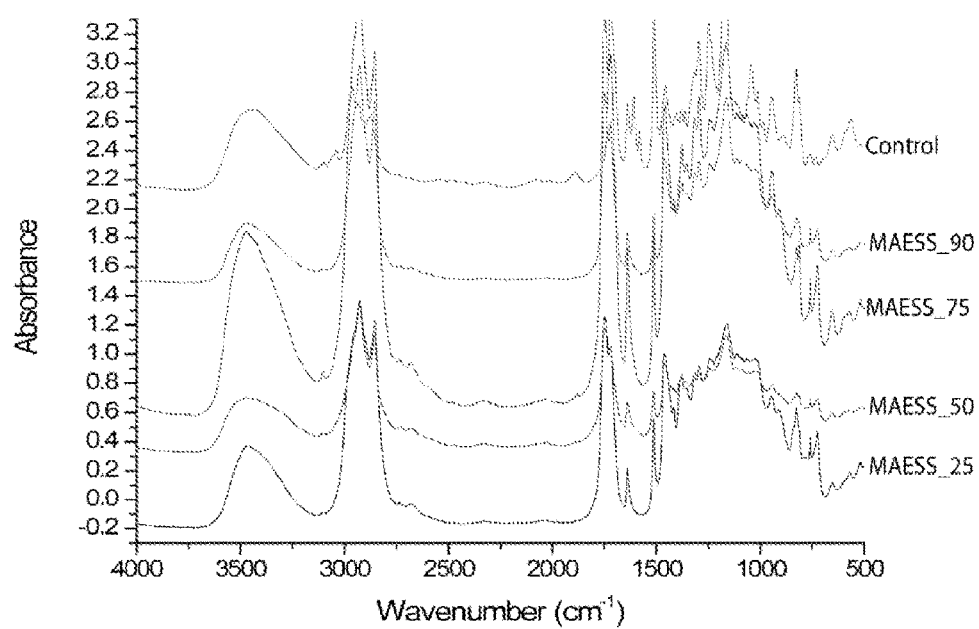

FIG. 13 depicts an FTIR of MAESS and control.

Figure 14:
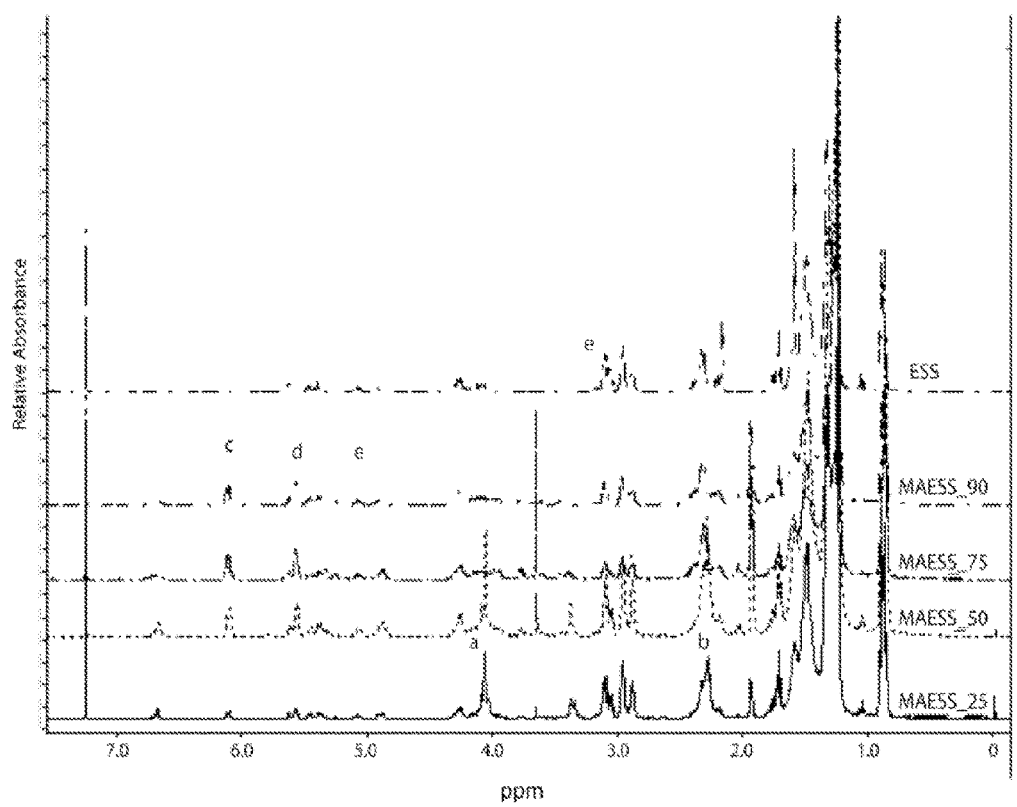

FIG. 14 depicts a $^1$H NMR on MAESS_25, MAESS_50, MAESS_75, MAESS_90, and ESS starting material.

Figure 15:
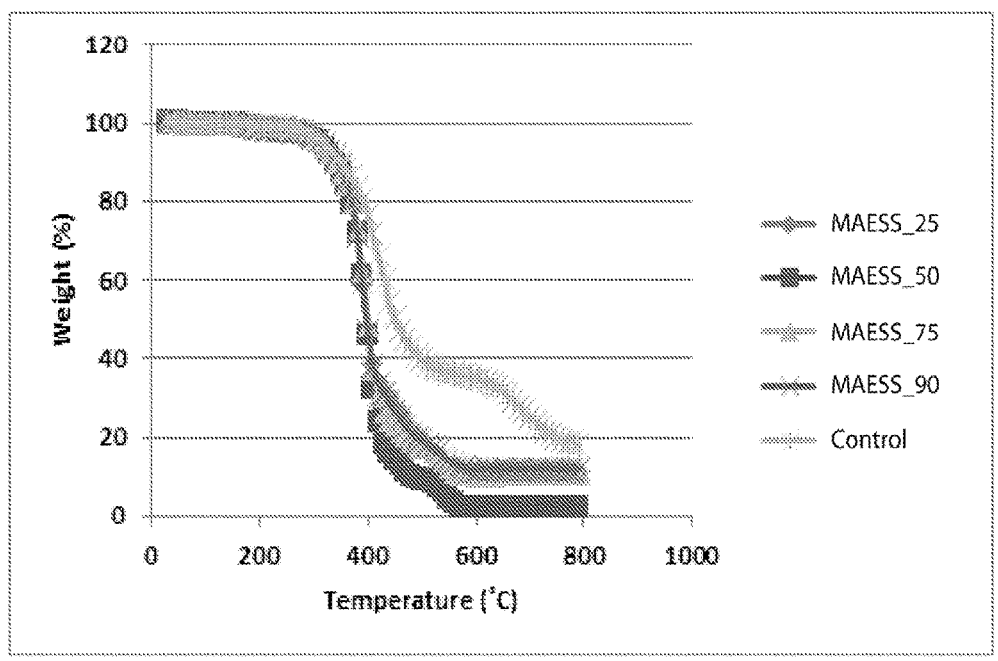

FIG. 15 depicts a TGA analysis of MAESS.

Figure 16:
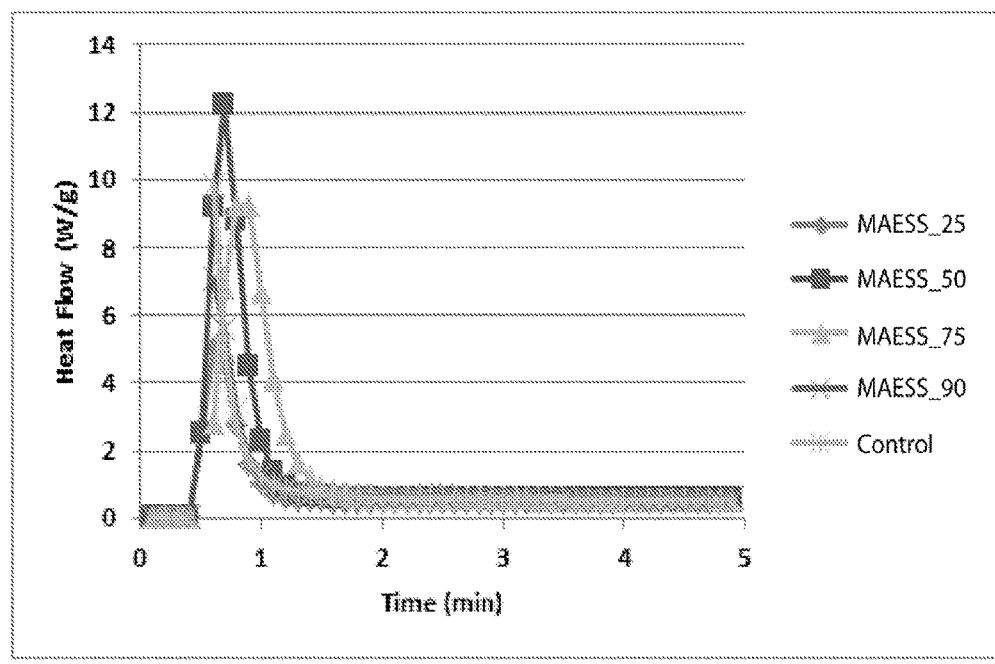

FIG. 16 provides a graph of a photo DSC of MAESS and Control.

DESCRIPTION OF THE INVENTION

The invention relates to polyfunctional bio-based methacrylate oligomers prepared by the ring-opening reaction between at least one ethylenically unsaturated acid selected from methacrylic acid, acrylic acid, and crotonic acid, and a polyfunctional bio-based epoxy resins.

The invention also relates to polyfunctional bio-based methacrylate oligomers that compare favorably to the properties of BPA, and are an appropriate bio-based substitute for the currently used petroleum-based dental resins.

Polyfunctional bio-based epoxy resins can be synthesized according to known methods in the art. See, e.g., Pan et al., *Green Chem.* 13:965-975 (2011), and WO 2011/097484, the disclosures of which are incorporated herein by reference. For example, the polyfunctional bio-based epoxy resin may be synthesized from the epoxidation of vegetable or seed oil esters of polyols having four or more hydroxyl groups/molecule. In one embodiment, the polyol is sucrose and the vegetable or seed oil is selected from corn oil, castor oil, soybean oil, safflower oil, sunflower oil, linseed oil, tall oil fatty acid, tung vernonia oil, and mixtures thereof. In one embodiment, the polyfunctional bio-based epoxy resin may be selected from epoxidized sucrose soyate (HS), epoxidized sucrose linseedate, epoxidized sucrose safflowerate and epoxidized tripentaerythritol soyate. The epoxy equivalent weights of the polyfunctional bio-based epoxy resin may range from 150 to 280 deg., as determined by epoxy titration according to ASTM D1652.

The molar ratios of the acid to epoxy in the at least one ethylenically unsaturated acid and polyfunctional bio-based epoxy resin, respectively, may range, for example, from 0.1 to 1.0.

The extent of reaction of the epoxy groups in the polyfunctional bio-based epoxy resin with methacrylic acid, acrylic acid, crotonic acid, or mixtures thereof may be varied by varying the amount of acid used in the reaction (i.e., the degree of methacrylation may vary). For example, as little as 10% or less of the epoxy groups may be reacted up to as much as 100% of the epoxy groups, resulting in resins having varying degrees of ethylenically unsaturated functionality. In one embodiment, the epoxide groups of the polyfunctional bio-based methacrylated oligomers may be fully methacrylated, where substantially all of the epoxide groups have been methacrylated, or it may be partially methacrylated, where only a fraction of the available epoxide groups have been methacrylated, for example, 25%-90% methacrylated. In one embodiment, epoxidized sucrose soyate, for example, may be methacrylate.d at 25%, 50%, 75%, and 90% methacrylation. It is understood in the art that some residual epoxide groups may remain even when full methacrylation is desired.

The polyfunctional bio-based methacrylate oligomers may be synthesized by a variety of methods. In one embodiment, the polyfunctional bio-based methacrylate oligomers are synthesized by methacrylating at least one epoxide group of a polyfunctional bio-based epoxy resin to at least one methacrylate group.

As is known in the art, numerous catalysts can be used to catalyze the acid-epoxy reaction and are reviewed in Blank et al., *J. Coat. Tech.* 74:33-41 (2002). Bases known to catalyze acid-epoxy reactions, such as 1,8-diazabicyclo [5.4.0]undec-7-ene (DBU), triethyl amine, pyridine, potassium hydroxide, and the like may be used. Quaternary ammonium and quaternary phosphonium compounds can also be used to catalyze the reaction. Triphenylphosphine may also be used. In addition, salts and chelates of metals such as aluminum, chromium, zirconium, or zinc may also be used. Catalysts AMC-2 and ATC-3, available from AMPAC Fine Chemicals, are chelates of chromium and effective catalysts for acid-epoxy reactions. The catalyst may be present in an amount ranging from 0.01 to 2.0 percent of the total weight of the polyfunctional bio-based methacrylate oligomer.

In addition, an inhibitor may be used in the ring-opening reaction between the at least one ethylenically unsaturated acid selected from methacrylic acid, acrylic acid, and crotonic acid, and the polyfunctional bio-based epoxy resin. For example, the inhibitor may be selected from hydroquinone, mono-t-butylhydroquinone, 2,5-di-t-butylhydroquinone, toluhydroquinone, hydroquinone methyl ether, hydroquinone ethyl ether, 4-t-butyl catechol, butylated hydroxyl toluene, and the like, and may be present in an amount ranging from 0.01% to 2.5% of total weight, more preferably 0.1% to 1.0% of the total weight of the polyfunctional bio-based methacrylate oligomer.

In one embodiment of the invention, methacrylated epoxidized sucrose soyate (MAESS) oligomers may be prepared by the acid-epoxide reaction using ESS and methacrylic acid as raw materials, and AMC-2 as the catalyst.

In another embodiment, the invention relates to a curable coating composition comprising at least one polyfunctional bio-based methacrylate oligomer, at least one optional diluent, and at least one optional initiator. The curable coating compositions may be made by mixing at least one polyfunctional bio-based methacrylate oligomer with at least one optional diluent and at least one optional initiator. In another embodiment, the invention relates to thermoset coatings formed from the curable coating compositions of the invention.

A further embodiment of the invention involves the free radical curing of the polyfunctional bio-based methacrylated oligomers and coating compositions containing these oligomers. Formulations may be prepared by mixing the methacrylated oligomer resin with an optional diluent, an optional solvent, and an initiator.

When a coating composition contains a polyfunctional bio-based methacrylated oligomer, the diluents may be ones used in free radical or vinyl polymerizations such as but not limited to, styrene, bisphenol A diglycidylether methacrylate (Bis-GMA), triethyleneglycol dimethacrylate (TEGDMA), isodecyl acrylate, 2-hydroxyethyl acrylate, butyl acrylate, 2-ethylhexyl acrylate, 1,6-hexanediol diacrylate, trimethylolpropane triacrylate, pentaerythritol tetraacrylate, ethoxylated trimethylolpropane triacrylate, and acrylated epoxidized soybean oil.

For curing of the polyfunctional bio-based methacrylated oligomers and coating compositions containing these oligomers, a free radical photoinitiator is needed. Suitable free radical photoinitiators include cleavage or Norrish type photoinitiators or Norrish type photoinitiators known in the art. Examples of Norrish type 1 photoinitiators are 2-hydroxy-2-methyl-1-phenyl-1-propanone, 2,2-diethoxyacetophenone, benzildimethylketal 1-hydroxycyclohexylphenylketone, 2,2'dimethoxy-2-phenylacetophenone, and the like. Examples of Norrish type II photoinitiators are benzophenone, benzio, xanthone, thioxanthone, and the like, combined with synergists such as triethanolamine, triethylamine, dimethylethanol amine, and the like.

For thermal curing, a thermally initiated free radical initiator is needed. Suitable thermally initiated free radical initiators include dialkyl peroxides, such as, for example, dicumyl peroxide, di-t-butyl peroxide, di-t-amyl peroxide, alpha, alpha' di(t-butyl peroxy diisopropyl benzenes, 2,5-dimethyl-2,5-di-(t-butyl peroxy) hexane, 2,5-dimethyl-2,6-di-(t-butyl peroxy) hexyne-3, t-butyl cumyl peroxide; diacyl peroxides, such as, for example, dibenzoyl peroxide, succinic acid peroxide, dilauryl peroxide, didecanoyl peroxide; diperoxyketals such as, for example, 1,1-di(t-butylperoxy)-3,3,5-trimethylcyclohexane, 1,1-di(t-butylperoxy)-cyclohexane, 1,1-di(t-amylperoxy)cyclohexane., n-butyl-4,4-di(t-butylperoxy)valerate, ethyl-3,3-di(t-amylperoxy)butyrate, ethyl-3,3-di(t-butylperoxy) butyrate; hydroperoxides, such as, for example, cumene hydroperoxide, diisopropylbenzene hydroperoxide, t-butyl hydroperoxide, t-amyl hydroperoxide; ketone peroxides, such as, for example, methyl ethyl ketone peroxide, 2,4-pentanedione peroxide; peroxydicarbonates, such as, for example, di(n-propyl) peroxydicarbonate, di(sec-butyl) peroxydicarbonate di(2-ethylhexyl) peroxydicarbonate; peroxyesters, such as, for example, alpha-cumyl peroxy neodecanoate, t-amyl peroxy neodecanoate t-butyl peroxy neodecanoate, t-amyl peroxypivalate, t-butyl peroxypivalate, 2,5-di(2-ethylhexanoylperoxy) 2,5-dimethylhexane, t-amyl peroxy 2-ethylhexanoate, t-butyl peroxy-2-ethylhexanoate, t-amyl peroxyacetate, t-butyl peroxyacetate, t-butyl peroxybenzoate, OO-(t-amyl) O-(2-ethylhexyl) monoperoxycarbonate, OO-(t-butyl) O-isopropyl monoperoxycarbonate, OO-(t-butyl) O-(2-ethylhexyl) monoperoxycarbonate poly-t-butylperoxy carbonate; azo initiators, such, for example, as 2,2'-azobis(2,4-dimethyl-pentanenitrile), 2,2'-azobis-(2-isobutyronitrile), 2,2'-azobis(2-methylbutyronitrile), 1,1'-azodicyclohexanecarbonitrile; and the like. Mixtures of initiators can be used.

When a composition containing a polyfunctional bio-based methacrylated oligomer is thermally cured, the composition may further comprise a diluent selected from, for example, styrene, bisphenol A diglycidylether methacrylate (Bis-GMA), triethyleneglycol dimethacrylate (TEGDMA) isodecyl acrylate, isodecyl methacrylate, 2-hydroxyethyl acrylate, 2-hydroxyethyl methacrylate, butyl acrylate, butyl methacrylate, 2-ethylhexyl acrylate, 2-ethylhexyl methacrylate, 1,6-hexanediol diacrylate, 1,6-hexanediol dimethacrylate, trimethylolpropane triacrylate, trimethylolpropane trimethacrylate, pentaerythritol tetraacrylate, pentaerythritol tetramethacrylate, ethoxylated trimethylolpropane triacrylate, ethoxylated trimethylolpropane trimethacrylate, acrylated epoxidized linsee methacrylated epoxidized linsee oil, acrylated epoxidized soybean oil, and methacrylated epoxidized soybean oil.

The invention also relates to the use of a coating composition comprising the polyfunctional bio-based methacrylated oligomers of the invention, which may be coated onto a substrate and cured using techniques known in the art. The substrate can be any common substrate such as paper, polyester films such as polyethylene and polypropylene, metals such as aluminum and steel, glass, urethane elastomers, primed (painted) substrates, and the like. The substrate may also be dental restorative materials. The coating composition of the invention may be cured thermally or photochemically, e.g., UV or electron beam cure. In another embodiment, the invention relates to an article of manufacture comprising a thermoset coating composition of the invention, such as, for example, dental resin composites.

The invention also relates to the use of a composition comprising the polyfunctional bio-based methacrylated oligomers of the invention, together with the optional initiators, diluents, catalysts, inhibitors, pigments, and solvents discussed herein, as a matrix resin for composites. For example, the composites may contain at least one layer of fibrous reinforcement material including, for example, those that add to the strength or stiffness of a composite when incorporated with the polyfunctional bio-based methacrylated oligomers of the invention. Non-limiting examples of reinforcing materials can be in the form of filaments, fibers, rovings, mats, weaves, fabrics, knitted material, cloth, PVC, PAN, PET, balsa, paper honeycomb, PP honeycomb of composite reinforcement, glass, Kevlar®, Spectra®, graphite, basalt, boron, or other known structures. Suitable reinforcement materials include glass fibers and fabrics, carbon fibers and fabrics, aramid fibers and fabrics, polyolefin fibers or fabrics (including ultrahigh molecular weight polyethylene fabrics such as those produced by Honeywell under the Spectra trade name), and polyoxazole fibers or fabrics (such as those produced by the Toyobo Corporation under the Zylon trade name). Other examples of reinforcement materials include core materials, such as, for example, various polymer foams, Nida-Core DIAB PVC, Gurit Corecell®, Airex® PVC and PET, Armacell® PET, ProBalsa® balsa, and BALTEK® balsa.

A curable coating composition according to the invention may also comprise a pigment (organic or inorganic) and/or other additives and fillers known in the art. For example a coating composition of the invention may further contain coating additives. Such coating additives include, but are not limited to, one or more leveling, rheology, and flow control agents such as silicones, fluorocarbons or cellulosics; extenders; reactive coalescing aids such as those described in U.S. Pat. No. 5,349,026, incorporated herein by reference; plasticizers; flatting agents; pigment wetting and dispersing agents and surfactants; ultraviolet (UV) absorbers; UV light stabilizers; tinting pigments; colorants; defoaming and antifoaming agents; anti-settling, anti-sag and bodying agents; anti-skinning agents; anti-flooding and anti-floating agents; biocides, fungicides and mildewcides; corrosion inhibitors; thickening agents; or coalescing agents. Specific examples of such additives can be found in Raw Materials Index, published by the National Paint & Coatings Association, 1500 Rhode Island Avenue, N.W. Washington, D.C. 20005. Further examples of such additives may be found in U.S. Pat. No. 5,371,148, incorporated herein by reference.

Examples of flatting agents include, but are not limited to, synthetic silica, available from the Davison Chemical Division of W. R. Grace & Company as SYLOID®; polypropylene, available from Hercules Inc., as HERCOFLAT®; synthetic silicate, available from J. M. Huber Corporation, as ZEOLEX®.

Examples of viscosity, suspension, and flow control agents include, but are not limited to, polyaminoamide phosphate, high molecular weight carboxylic acid salts of polyamine amides, and alkylene amine salts of an unsaturated fatty acid, all available from BYK Chemie U.S.A. as ANTI TERRA®. Further examples include, but are not limited to, polysiloxane copolymers, polyacrylate solution, cellulose esters, hydroxyethyl cellulose, hydroxypropyl cellulose, polyamide wax, polyolefin wax, hydroxypropyl methyl cellulose, polyethylene oxide, and the like.

Solvents may also be added to the curable coating compositions in order to reduce the viscosity. Hydrocarbon, ester, ketone, ether, ether-ester, alcohol, or ether-alcohol type solvents may be used individually or in mixtures. Examples of solvents can include, but are not limited to benzene, toluene, xylene, aromatic 100, aromatic 150, acetone, methylethyl ketone, methyl amyl ketone, butyl acetate, t-butyl acetate, tetrahydrofuran, diethyl ether, ethylethoxy propionate, isopropanol, butanol, butoxyethanol, and so on.

EXAMPLES

Example 1

1.1 Materials

Sucrose soyate (Sefose® 1618U) and sucrose soyate-B6 (Sefose® 1618U-B6) were supplied by Procter & Gamble Chemicals (Cincinnati, Ohio). Epoxidized soybean oil (Vikoflex 7170), as well as free radical initiators Luperox P (t-butyl peroxybenzoate), and Luperox 10M75 (t-butyl peroxyneodecanoate, 75% in odorless mineral spirits) were supplied by Arkema (Philadelphia, Pa.). AMC-2, which is a 50% solution of trivalent organic chromium complexes in phthalate esters, was purchased from AMPAC Fine Chemicals (Rancho Cordova, Calif.). Methacrylic acid, hydroquinone, and styrene were purchased from sigma Aldrich (St, Louis, Mo.). All the reagents were used without further purification unless specified. Epoxidized sucrose soyate (ESS) and epoxidized sucrose soyate-B6 (ESS-B6) were prepared according to the procedure in the literature. See Pan et al., *Green Chem.* 13:965-975 (2011). Epoxy equivalent weights (EEW), which were determined by epoxy titration according to ASTM D 1652, were 245 and 275 g/eq., respectively.

1.2 Synthesis of Methacrylated Epoxidized Sucrose Soyate (MAESS)

The ring-opening reactions between methacrylic acid with ESBO, ESS, or ESS-B6 (the structures of which are shown in Scheme 1) were carried out at 90° C. in bulk, using AMC-2 as the catalyst and hydroquinone as the inhibitor. The molar ratios of acid to epoxy were 0.5, 0.7, and 0.8. Therefore, the resins were named by these ratios, e.g., MAESS-0,5 was made from ESS and methacrylic acid with an acid to epoxy molar ratio of 0.5. A typical procedure is as follows. Epoxidized sucrose soyate (60.00 g), methacrylic acid (16.849 g, acid to epoxy molar ratio=0.8), hydroquinone (0.0768 g, 0.1% of total weight), and AMC-2 (0.7685 g, 1.0% of total weight) were placed into a single-necked, round-bottomed flask equipped with a magnetic stirrer. The flask was sealed with rubber septa, and the mixture was heated at 90° C. for 24 hours. After being cooled to room temperature, a dark green, viscous liquid was obtained as the product. No further purification was carried out before characterization or formulation.

1.3 Characterization of Oligomers

Fourier-transform Infrared Spectroscopy (STIR) was performed with a Thermo Scientific Nicolet 8700 with a detector type of DTGS KBr under nitrogen purge. Diluted samples were applied on a KBr window and the absorption spectra were taken with 32 scans at resolution of 4 cm$^{-1}$. Molecular weights of the resins were obtained using a Symyx Rapid gel permeation chromatography system (rapid GPC) which consists of a dual-arm liquid-handling robot coupled to a temperature adjustable GPC system using an evaporative light scattering detector (Polymer Laboratories ELS 1000) and 2XPLgei Mixed-B columns (10 µm size), Samples were diluted to 3 mg/ml in stabilized THE for GPC runs, THE was used as the eluent at a flow rate of 2.0 mL min$^{-1}$ and molecular weights were determined using polystyrene standards. $^1$H NMR was conducted with a JOEL-ECA (400 MHz) NMR spectrometer with an auto-sampler, using CDCl$_3$ as the solvent. Acid number titration was carried out according to ASTM D664. The viscosity of the resins was measured at 25° C. using an ARES Rheometer (TA Instruments) operating from 0.1 rad/sec to 500 rad/sec with 0.1% strain.

1.4 Curing of the Oligomers

Styrene was used as the reactive diluent for the curing of MAESS, at 10%, 20%, and 30% of total weight, as well as a sample without styrene. Luperox P (2% of total resin weight) and Luperox 10M75 (2% of total resin weight) were utilized as the free-radical initiators. Prior to curing, all of the ingredients, including MAESS, initiators, and styrene, were mixed thoroughly with a high-speed mixer. The curing was conducted in a sealed, Teflon-coated, stainless steel mold. Atypical procedure is as follows. MAESS (4.50 g), styrene (0.50 g), Luperox P (0.10 g), and Luperox 10M75 (0.10 g) were placed into a 20-ml plastic vial. The ingredients were mixed for 5 minutes at 3500 rpm using a high speed mixer. The mixture was then transferred into the mold, and cured at 150° C. for 1 hour, 175° C. for 1 hour, and 200° C. for five hours. After being cooled to room temperature, the thermosets were removed from the mold.

1.5 Characterization of Thermosets

Thermal stability was determined using a Q1000 thermogravimetric analysis (TGA) system (TA instruments) with a heating rate of 20° C./min from room temperature to 600° C. under a continuous nitrogen flow. Tensile measurements were performed on an Instron 5542 system Onstron Corp., Norwood, Mass.). ASTM D412-D dumbbell specimens were used with a strain rate of 0.2% s$^{-1}$. Five samples were measured for each thermoset, and the averages were reported. The thicknesses of the specimens were around 0.5 mm for DMTA and tensile measurements. Dynamic mechanical thermal analysis (DMTA) was obtained on a 0800 DMA (TA Instruments) operating at 1 Hz and a heating rate of 5° C./min from −75 to 200° C. (tensile mode). The glass transition temperature (T$_g$) was determined as the peak temperature of tan δ curve, and the storage modulus (E') in the rubbery plateau region was determined at 60° C.: above the T$_g$. The crosslink density (v$_e$) was calculated using Equation 1, according to the theory of rubber elasticity:

$$E'=3v_e RT \qquad \text{Equation 1}$$

where E' is the storage modulus of the thermoset in the rubbery plateau region, R is the gas constant, and T is the absolute temperature. Gel content of the thermosets was determined by solvent extraction using dichloromethane. A 250 ml flask containing 150 ml dichloromethane was equipped with a Soxhlet extractor which is connected to a condenser. Polymer samples (around 1 gram) were weighed and placed into the thimble. Samples were extracted for 24 hours by dichloromethane. Then the wet residual samples were dried in vacuum and weighed. The gel content of thermoset is given by Equation 2:

$$\% \text{ Gel Content} = 100 \times \frac{W_{gel}}{W_t} \qquad \text{Equation 2}$$

where W$_t$ is the initial weight of thermoset sample, and W$_{gel}$ is the weight of residue after extraction. Bio-based content of the thermosets was calculated according to the method in the literature. See Pan et al., *Biomacromolecules* 12:2416-2428 (2011); Pan et al., *Macro. Rapid Comm.* 32:1324-1330 (2011); Pan et al., *ChemSusChem* 5:419-429 (2012).

1.6 Results and Discussion 1.6.1 Synthesis and Characterization of Oligomers

Figure 1:
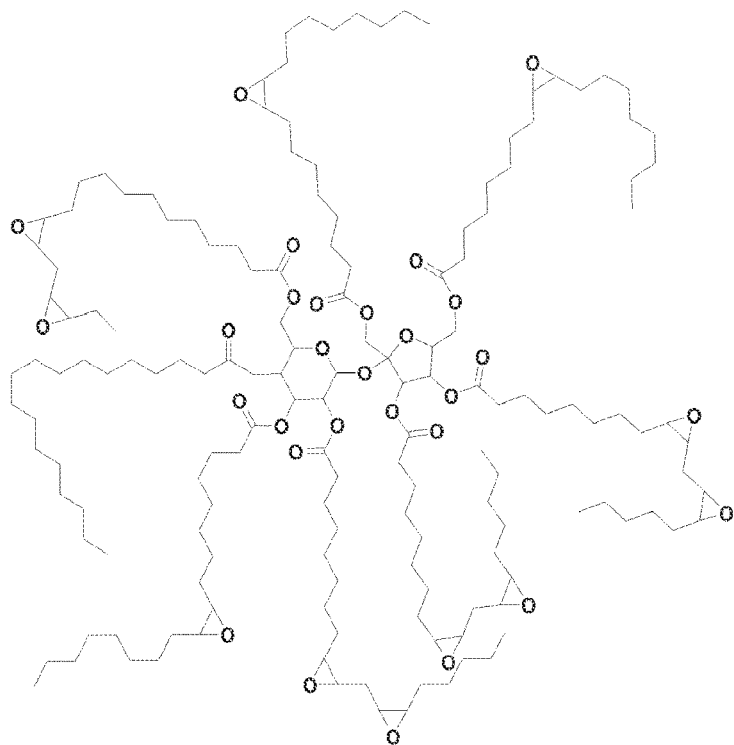
FIG. 1 depicts the structure of epoxidized sucrose soyate.
Figure 2:
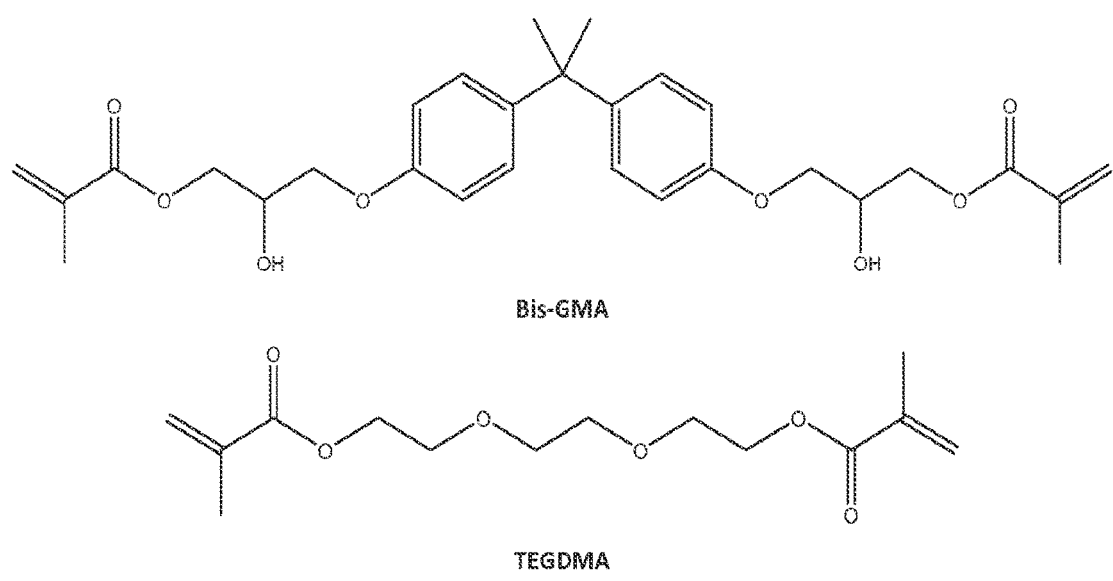
FIG. 2 depicts the structures of bisphenol A diglycidylether methacrylate (Bis-G A) and triethyleneglycol dimethacrylate (TEGDMA).
Figure 3:
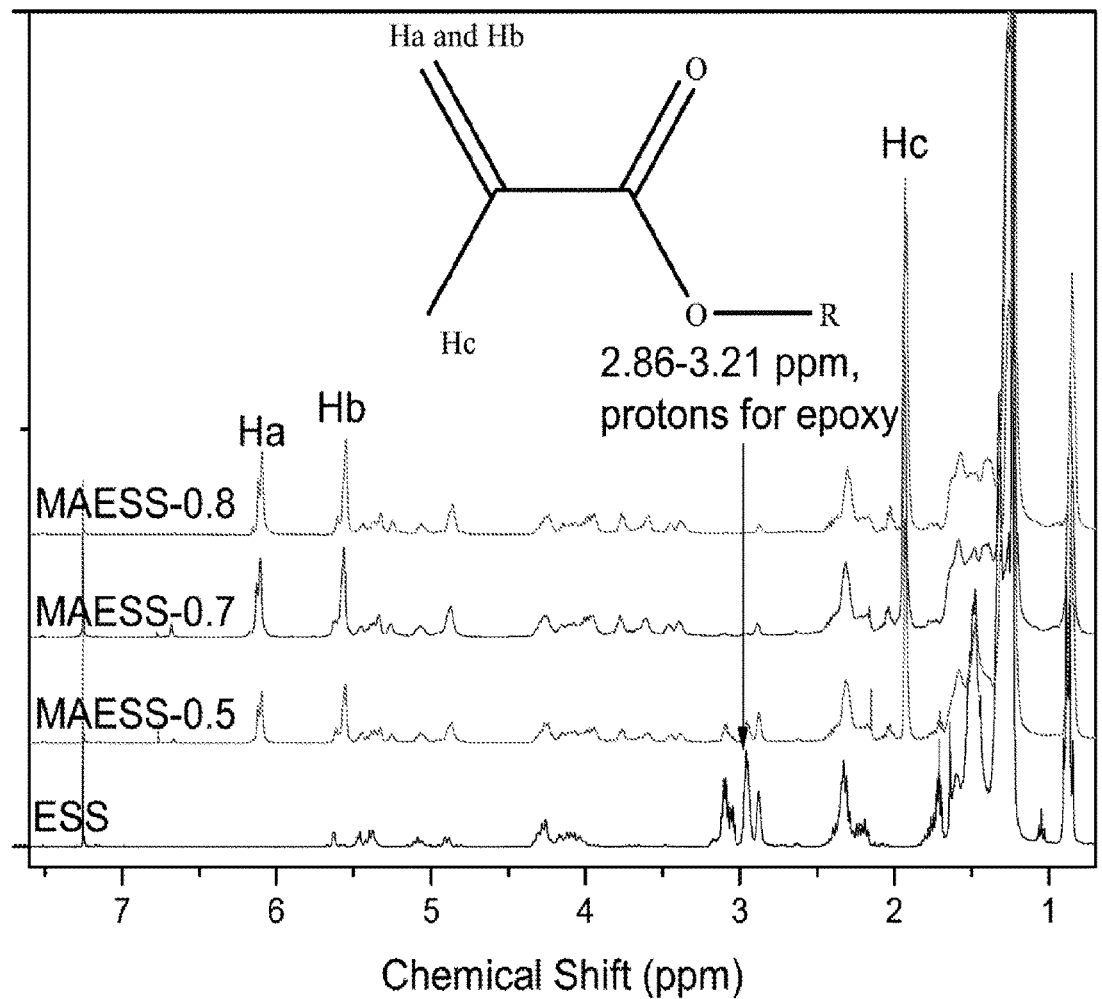
FIG. 3 depicts $^1$H NMR spectra of epoxidized sucrose soyate (ESS), methacrylated epoxidized sucrose soyates with add to epoxy molar ratios of 0.5 (MAESS-0.5), 0.7 (MAESS-0.7), and 0.8 (MAESS-0.8) in CDCl$_3$-d$_1$.
Figure 4:
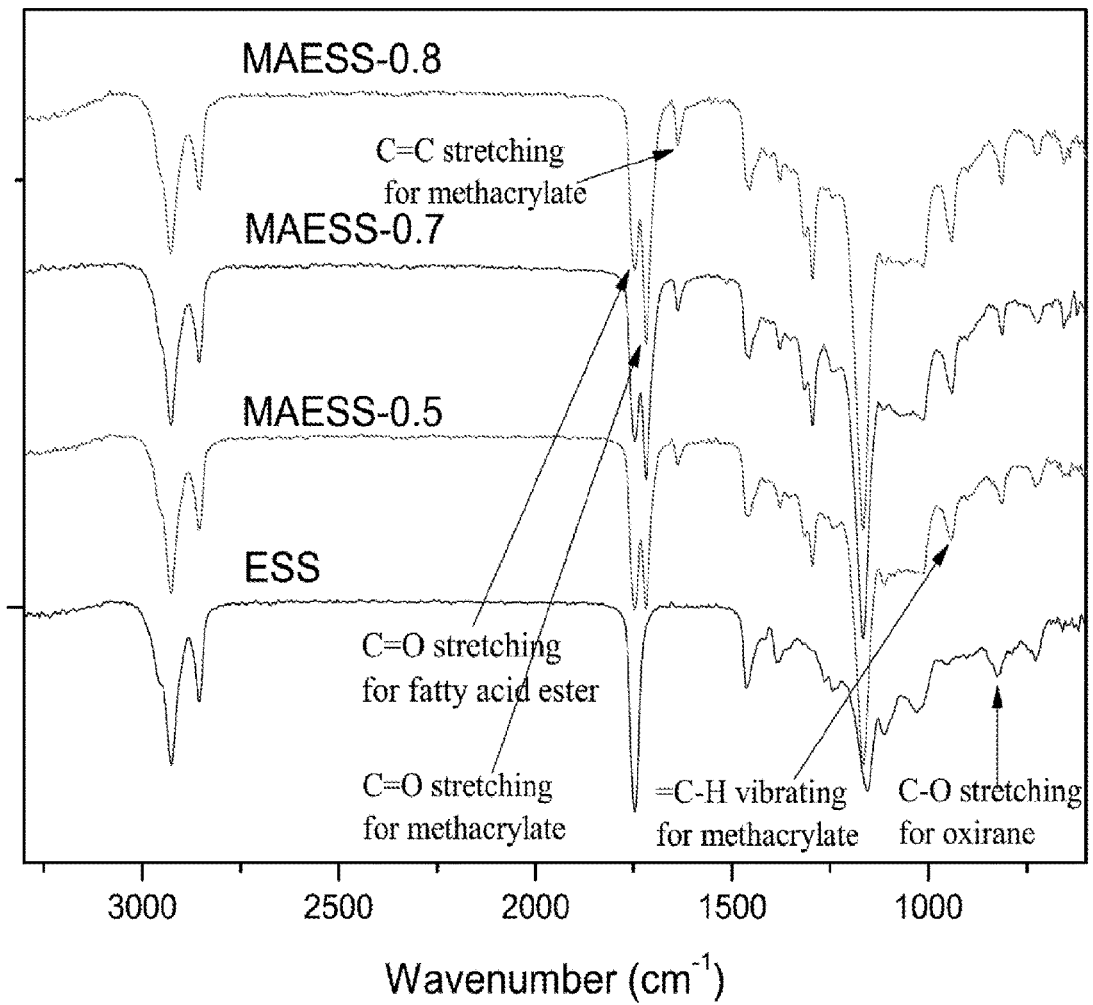
FIG. 4 depicts FT-IR spectra of epoxidized sucrose soyate. (ESS), methacrylated epoxidized sucrose soyates with acid to epoxy molar ratios of 0.5 (MAESS-0.5), 0.7 (MAESS-0.7), and 0.8 (MAESS-0.8).

As depicted in Scheme 2, the synthesis of methacrylated epoxidized soybean oil (MAESBO), methacrylated epoxidized sucrose soyate (MAESS), and methacrylated epoxidized sucrose soyate-B6 (MAESS-B6) was catalyzed by AMC-2, which is trivalent chromium complex diluted with phthalate esters. AMC-2 was chosen since it suppresses the side reaction of hydroxyl-epoxy reactions, however, imparts a green color to the product, which could be objectionable in some applications. Hydroquinone (0.1 wt %) was added as an inhibitor to prevent premature polymerization. Three different molar ratios of acid to epoxy were studied: 0.5, 0.7, and 0.8. The resulting oligomers were fully characterized via acid number titration, $^1$H NMR, FTIR, GPC, and rheometery. The basic properties of these oligomers are shown in Table 1. NMR spectra of ESS, MAESS-0.5, MAESS-0.7, and MAESS-0.8 are shown in FIG. 3. The peaks around 2.8-3.2 ppm are assigned to the protons in the epoxy group. After the reaction between epoxy and methacrylic acid, these peaks became less intense, and even disappeared. The intensity of the epoxy peaks in MAESS resins decreased with the increase of methacrylic acid substitution. Meanwhile, new peaks around 6.1, 5.6, and 1.9 ppm, which represent the protons in the vinyl and methyl groups of methacrylate, appeared in the NMR spectrum of MAESS resins, and their intensity increased with increasing amounts of methacrylic acid equivalents. These results indicated the successful conversion of epoxy to methacrylates. The structures of MAESS were further characterized via FT-IR (FIG. 4). The bands around 1720, 1640, and 940 cm$^{-1}$ were assigned to the characteristic absorptions of C=O stretching, C=C stretching, and =C—H vibration of methacrylates, respectively. The characteristic band for oxirane C—O disappeared after methacrylation. The FT-IR spectrum further confirmed the successful synthesis of MAESS. It was found that the conversion from epoxy to methacrylate was higher than 90% when the acid-to-epoxy ratio was higher than 0.8. Further increase in acid equivalents could result in a large fraction of unreacted acid in the oligomers. The methacrylate functionality per molecule of the synthesized MAESS ranges from 5.21 to 8.22, which is much higher than that of MAESBO (2.79). Meanwhile, the bio-based content of these oligomers is higher than 80%, which is very helpful for the preparation of thermosets with high bio-renewable content.

Figure 5:
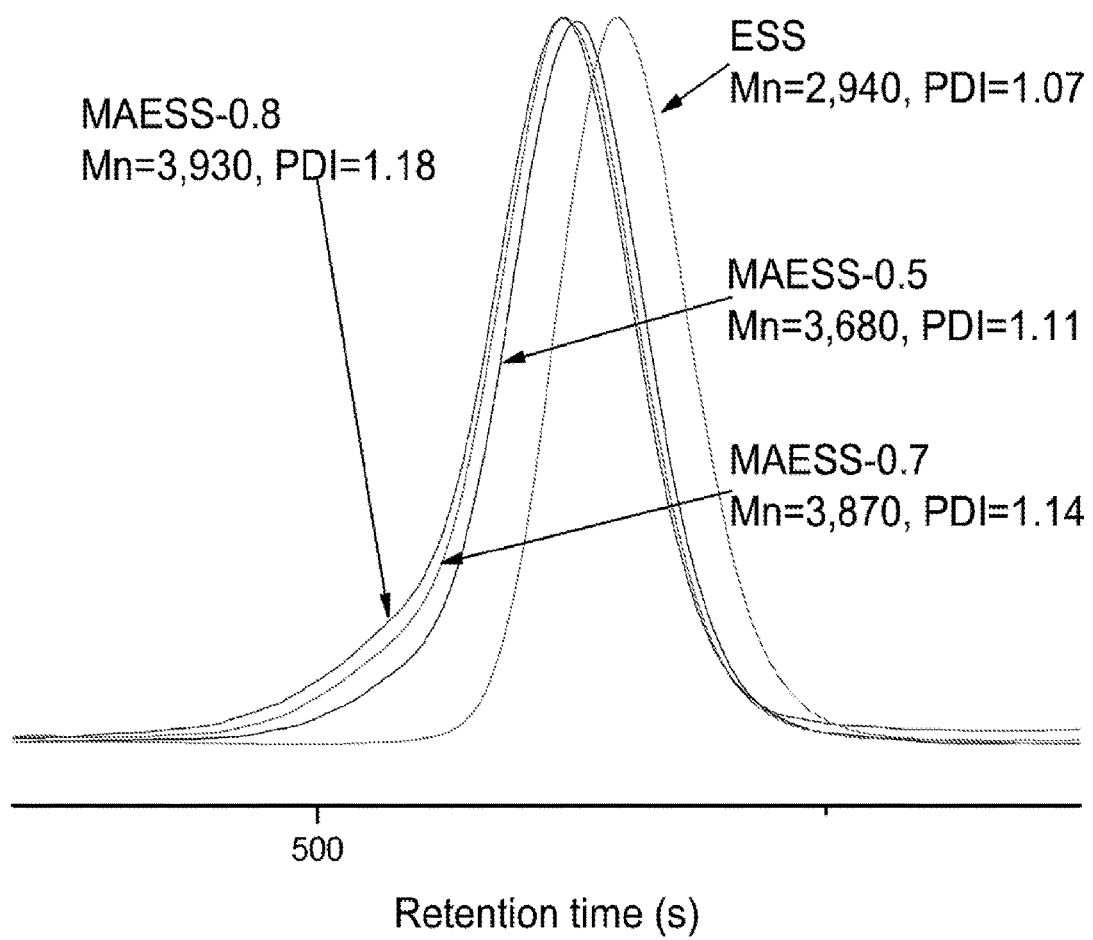
FIG. 5 depicts GPC traces of epoxidized sucrose soyate (ESS), methacrylated epoxidized sucrose soyates with acid to epoxy molar ratios of 0.5 (MAESS-0.5) 0.7 (MAESS-0.7) and 0.8 (MAESS-0.8).

The molecular weights of MAESS were determined by rapid GPC, illustrated in FIG. 5. After the acid-epoxy reaction, the molecular weights and the PDI increase compared to ESS, as expected. The side reaction between epoxy and the secondary hydroxyl group, which was the product of the acid-epoxy reaction, is believed to be the cause of the higher PDI, as well as the higher molecular weight shoulders observed in the GPC traces.

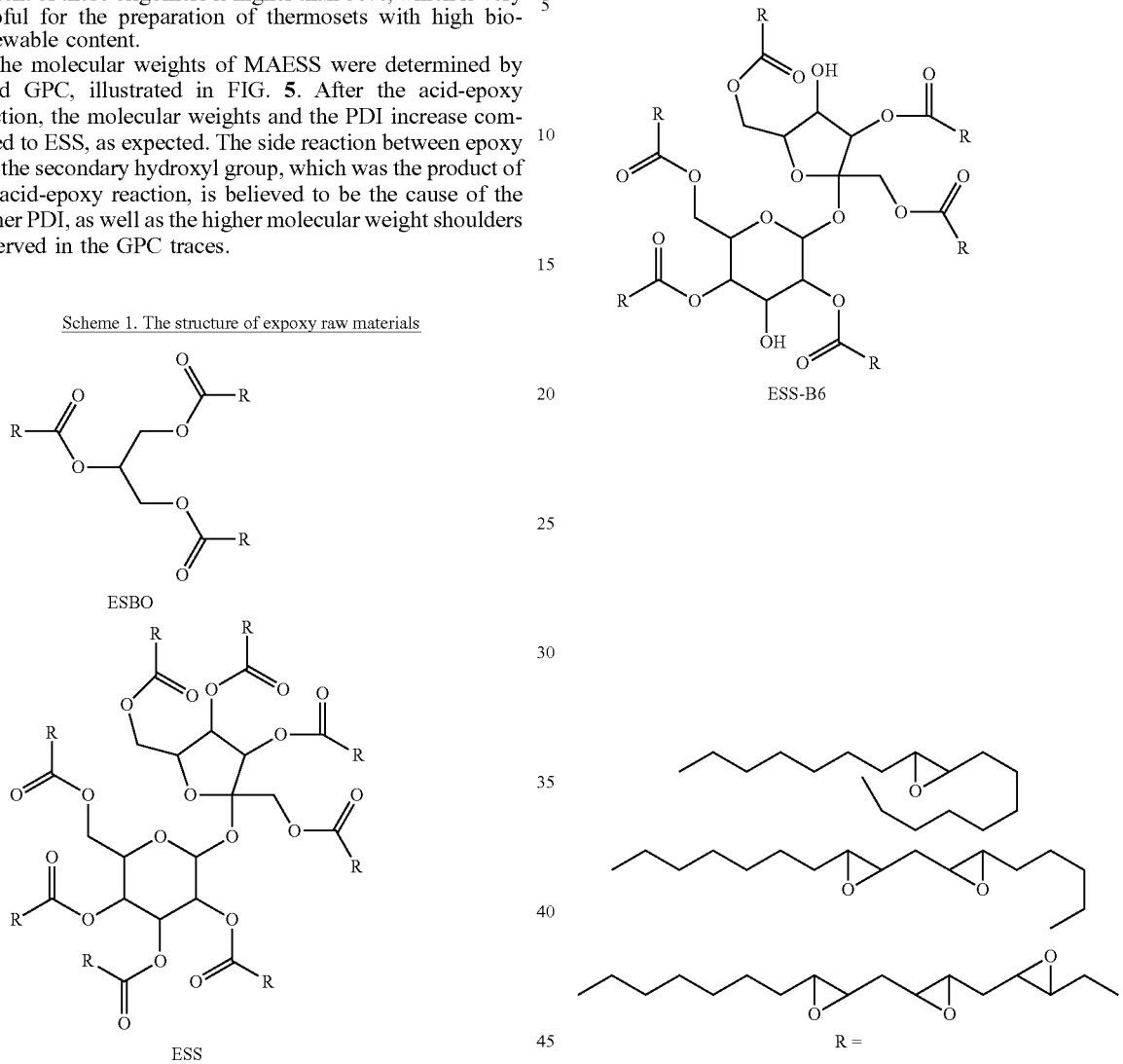

Scheme 1. The structure of epoxy raw materials

ESBO

ESS

ESS-B6

R =

TABLE 1

Properties of methacrylated epoxidized sucrose soyate (MAESS)

| Oligomer | Bio-based content (%) | Mn (g/mol)[a] | PDI[b] | Viscosity (Pa · s)[c] | Acid number | Acid conversion (%)[d] | Methacrylate functionality[e] |
|---|---|---|---|---|---|---|---|
| MAESBO-0.7 | 82.9 | 1,780 | 1.09 | 6.65 | 13 | 91.6 | 2.79 |
| MAESS-0.5 | 88.4 | 3,670 | 1.11 | 37.04 | 6 | >99 | 5.36 |
| MAESS-0.7 | 83.6 | 3,870 | 1.14 | 75.03 | 9 | 96.7 | 7.26 |
| MAESS-0.8 | 81.7 | 3,930 | 1.18 | 95.01 | 11 | 95.9 | 8.22 |
| MAESS-B6-0.5 | 88.5 | 3,320 | 1.13 | 65.47 | 5 | >99 | 3.72 |
| MAESS-B6-0.7 | 84.8 | 3,370 | 1.18 | 153.66 | 7 | >99 | 5.21 |
| MAESS-B6-0.8 | 83.0 | 3,470 | 1.13 | 198.20 | 10 | 94.3 | 5.62 |

[a]Measured by GPC
[b]Polydispersity index
[c] Measured by rheometery at 25° C., the viscosity was taken at a frequency of 100 Hz.
[d]Calculated by $^1$H NMR
[e] Calculated by the feed ratio of methacrylic acid and the conversion calculated by $^1$H NMR

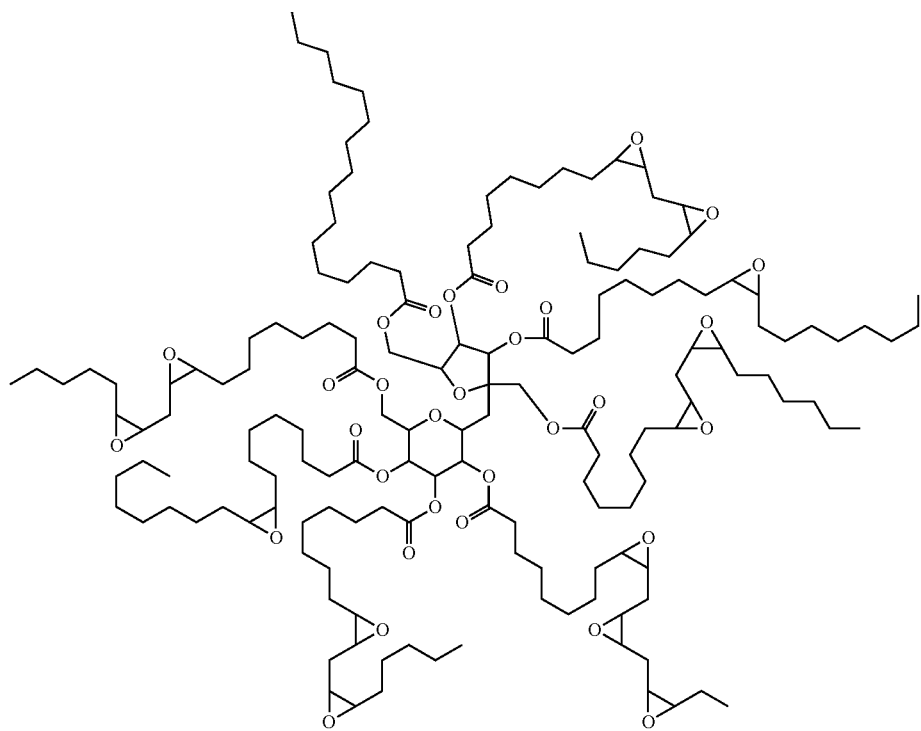
Methacrylic acid, Acid: Epoxy = 0.5, 0.7, 0.9 | AMC-2, Hydroquinone, 90° C.
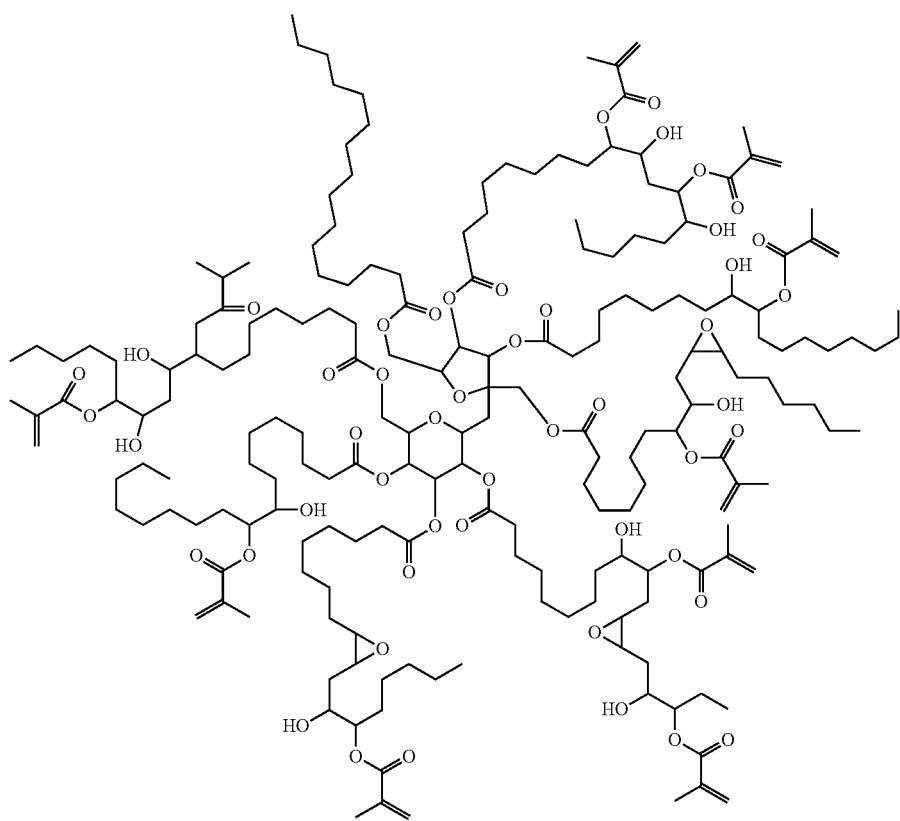

-continued 0, 10%, 20%, 30% Styrene | 150° C. 1 hour
2% Luperox P | 175° C. 1 hour
2% Luperox 10M75 | 200° C. 5 hours

↓

Biobased thermosets

The viscosities of methacrylated resins were characterized via rheometry and summarized in Table 1. Methacrylated epoxidized soybean oil (MAESBO) showed the lowest viscosity due to its low molecular weight. The polyfunctional bio-based methacrylated oligomers based on ESS-B6 showed higher viscosity values than those based on ESS, which can be explained by the two extra hydroxyl groups in the sucrose core of MAESS-86 as well as the lower fatty acid content. The viscosity increases as the degree of methacrylation increases due to the formation of increasing numbers of hydroxyl groups. The viscosity values of MAESS resins were mostly higher than 50 Pa·s, which is too viscous to be used for thermoset formulations. Therefore, styrene was introduced as a reactive diluent to reduce the viscosity, as well as a co-monomer to increase the rigidity of the resulting thermosets. All the resins were compatible with styrene and formed homogeneous blends at all ratios studied. The viscosity of the formulations as a function of styrene content is shown in FIG. 6. The viscosity values were lower than 10 and 1 Pa·s with 20% and 30% styrene, respectively. These results indicated that styrene is an effective reactive diluent for MAESS.

1.6.2 Curing of Methacrylated Resins

The synthesized polyfunctional bio-based methacrylated oligomers with and without styrene were formulated and cured via a thermally initiated free radical mechanism. Luperox P and Luperox 10M75 were utilized as initiators with a total weight percentage of 4%. The initiators, pc,dyfunctional bio-based methacrylated oligomers, and styrene were blended thoroughly prior to curing. Curing was conducted at 150° C. for one hour, 175° C. for one hour, and 200° C. for 5 hours. The extent of cure was characterized by FT-IR and gel-content measurements. The absorption bands around 940 and 910 cm$^{-1}$ were the peaks associated with the out-of-plane bending of C—H bonds in the vinyl groups of the methacrylated resins and styrene, respectively (FIG. 7). The absorption bands around 1640 and 1630 cm were attributed to stretching of C=C in the vinyl groups of methacrylated resins and styrene, respectively. As shown in FIGS. 7a and 7b, these characteristic peaks for vinyl groups completely disappeared in the cured materials. Furthermore, the gel content of all of the cured materials was higher than 95%, which also confirmed the completion of the polymerization.

1.6.3 Properties of Cured Materials 1.6.3.1 Dynamic Mechanical Thermal Analysis (DMTA)

The glass transition temperature ($T_g$) and crosslink density ($v_e$) were characterized via dynamic mechanical thermal analysis (DMTA), and the results are summarized in Table 2. Methacrylated epoxidized soybean oil with an acid to epoxy ratio of 0.7 (MAESBO-0.7) was also investigated as a control. The temperature dependence of storage modulus and tan δ for thermosets based on MAESBO-0.7, MAESS-0.5, MAESS-0.7, and MAESS-0.8 are shown in FIG. 8. The glass transition region was very broad due to the multiple relaxations existing in soybean oil-derived polymers. The $T_g$ values of these thermosets were in the order of MAESS-0.8>MAESS-0.7>MAESS-0.5>MAESBO-0.7, ranging from 45.7 to 108.8° C. Meanwhile, the crosslink densities of these polymers also followed the same trend. Higher methacrylate functionality leads to higher crosslink densities and higher glass transition temperatures, for a given oligomer architecture. In spite of lower methacrylate functionality, thermosets based on pure MAESS-B6 showed higher $T_g$ values than the corresponding thermosets based on pure MAESS, which can be attributed to the higher content of the rigid sucrose ring, as well as the extra hydrogen bonding of the unsubstituted hydroxyl groups in the sucrose ring.

TABLE 2

Thermal properties, bio-based content, crosslink densities, and gel content of MAESS-based thermosets

| Formulation (weight %) | Bio-based content (%) | $T_g$ (° C.) | $v_e$ ($10^{-3}$ mol/mm$^3$) | $T_{5\%}$ (° C.)$^a$ | Gel content (%) |
|---|---|---|---|---|---|
| 100% MAESBO | 79.7 | 46 | 3.11 | 295 | 97.2 |
| 90% MASBO/10% styrene | 69.5 | 82 | 2.18 | 309 | 95.8 |
| 80% MAESBO/20% styrene | 59.9 | 90 | 2.00 | 299 | 97.1 |
| 70% MAESBO/30% styrene | 50.9 | 94 | 1.13 | 297 | 94.5 |
| 100% MAESS-0.5 | 85.1 | 63 | 4.30 | 305 | 97.8 |
| 90% MAESS-0.5/10% styrene | 74.3 | 89 | 3.06 | 294 | 98.2 |
| 80% MAESS-0.5/20% styrene | 64.2 | 95 | 2.56 | 302 | 96.1 |
| 70% MAESS-0.5/30% styrene | 54.6 | 98 | 1.87 | 302 | 98.5 |
| 100% MAESS-0.7 | 80.4 | 92 | 4.46 | 306 | 97.5 |
| 90% MAESS-0.7/10% styrene | 70.0 | 116 | 6.87 | 302 | 97.8 |
| 80% MAESS-0.7/20% styrene | 60.3 | 119 | 4.16 | 297 | 97.2 |
| 70% MAESS-0.7/30% styrene | 51.2 | 121 | 2.91 | 285 | 95.9 |
| 100% MAESS-0.8 | 78.5 | 109 | 5.17 | 300 | 96.8 |
| 90% MAESS-0.8/10% styrene | 68.4 | 132 | 7.42 | 304 | 97.9 |
| 80% MAESS-0.8/20% styrene | 58.8 | 137 | 5.57 | 307 | 96.4 |
| 70% MAESS-0.8/30% styrene | 49.9 | 130 | 4.81 | 308 | 96.0 |
| 100% MAESSB6-0.5 | 85.1 | 65 | 3.72 | 274 | 95.2 |
| 90% MAESSB6-0.5/10% styrene | 74.1 | 80 | 3.01 | 290 | 97.3 |
| 80% MAESSB6-0.5/20% styrene | 63.6 | 93 | 2.14 | 292 | 97.7 |
| 70% MAESSB6-0.5/30% styrene | 54.1 | 97 | 1.21 | 297 | 96.7 |

TABLE 2-continued

Thermal properties, bio-based content, crosslink densities, and gel content of MAESS-based thermosets

| Formulation (weight %) | Bio-based content (%) | $T_g$ (° C.) | $v_e$ ($10^{-3}$ mol/mm$^3$) | $T_{5\%}$ (° C.)$^a$ | Gel content (%) |
|---|---|---|---|---|---|
| 100% MAESSB6-0.7 | 81.5 | 108 | 4.02 | 277 | 98.1 |
| 90% MAESSB6-0.7/10% styrene | 70.9 | 110 | 3.62 | 271 | 96.4 |
| 80% MAESSB6-0.7/20% styrene | 61.0 | 117 | 3.16 | 298 | 97.1 |
| 70% MAESSB6-0.7/30% styrene | 51.6 | 122 | 2.53 | 293 | 95.6 |
| 100% MAESSB6-0.8 | 79.7 | 114 | 4.56 | 264 | 98.2 |
| 90% MAESSB6-0.8/10% styrene | 69.3 | 121 | 5.56 | 262 | 97.9 |
| 80% MAESSB6-0.8/20% styrene | 59.6 | 121 | 4.49 | 292 | 97.6 |
| 70% MAESSB6-0.8/30% styrene | 50.4 | 122 | 3.50 | 293 | 95.5 |

The dependence of crosslink density as a function of styrene content is plotted in FIG. 9. During the cure of methacrylate oligomers there are two possible kinds of propagation reactions, intermolecular propagation and intramolecular propagation. Intramolecular propagation does not contribute to elastically effective network chains. The possibility of intramolecular propagation increases with the increase of methacrylate functionality and resin viscosity. The introduction of styrene gives rise to two opposing effects on the crosslink densities of thermosets. First, as a mono-functional monomer, styrene can only produce linear polymer. Thus, the addition of styrene decreases the crosslink density. Conversely, as a reactive diluent, styrene can reduce the viscosity and therefore enhance the mobility of the resin system. Higher mobility can facilitate the intermolecular propagation and therefore increase the crosslink density. These two opposing effects compete with each other during the curing of thermosets. The first one is predominant when the functionality and viscosity are relatively low, while the second one overrides the first one when the functionality and viscosity are higher. Therefore, for the thermosets based on oligomers with higher methacrylate functionality and viscosity (MAESS-0.8, MAESS-0.7, and MAESS-B6-0.8), the crosslink densities increased with the addition of 10% styrene, and then decreased with the addition of 20% and 30% styrene. Whereas, for thermosets based on oligomers with lower methacrylate functionality and viscosity (MAESBO-0.7, MAESS-0.5, MAESS-B6-0.5, and MAESS-B6-0.7), the crosslink densities always decreased with increasing styrene content.

The $T_g$ values of the thermosets with styrene can be influenced by two factors: the changing composition as the amount of styrene is changed, and the crosslink densities which are also related to styrene content. The temperature dependence of storage modulus and tan δ for thermosets based on MAESS-0.8 with varied styrene content was illustrated in FIG. 10. There was no evidence of phase separation within these polymers, and the breadth of the glass transition decreases as the increase of styrene content increases. The thermosets with 10% and 20% styrene even showed higher $T_g$ than that with 30% styrene, which can be explained by their high crosslink densities.

The dependence of $T_g$ values as a function of styrene content is plotted in FIG. 11. Except for thermosets based on MAESS-0.8 and styrene, the $T_g$ values always increased with increasing styrene content due to the rigidity of benzene rings and the intermolecular propagation promoted by styrene. For thermosets based on oligomers with higher functionality, the $T_g$ values of copolymers were higher than those of the homopolymers based on MAESS or styrene, which offers further confirmation that styrene can promote intermolecular propagation. For thermosets based on oligomers with lower functionality, co-polymers showed higher $T_g$s than those without styrene, but not higher than the $T_g$ of polystyrene homopolymer (≈100° C.). This result is in accordance with the results for polymers derived from acrylated epoxidized vegetable oils and styrene. See La Scala et al., Polymer 46:61-69 (2005). $T_g$ values increased at a higher rate with the addition of 10 wt % styrene, and then increased at a lower rate with the addition of 20 wt % and 30 wt % styrene. At higher styrene content, the effect of the introduction of rigid styrene was partially cancelled by the decrease of crosslink densities. Thermosets based on MAESS-0.8 are outliers regarding the $T_g$ trend as a function of styrene content. The high functionality of MAESS-0.8, which leads to a high crosslink density, accounts for the unusual $T_g$ trend. Although the $T_g$ trend for all the thermosets can be rationalized in terms of the rigidity of styrene and the crosslink density, more detailed models for highly cross-linked system, such as Fox and Losheak model or Stutz model (see Fox et al., J. Polym, Sci, 15:3761-390 (1955); Stutz et al., J. Polym. Sci. Polym. Phys. 28:1483-1498 (1990)), are required to fit the Tg results described here.

1.6.3.2 Tensile Properties

The tensile properties of thermosets based methacrylated epoxidized sucrose soyate are summarized in Table 3. In general, the mechanical properties of thermosets based on MESBO and MAESS are related to the functionality of oligomers, the structure of the oligomers, and the styrene content. Higher styrene content resulted in higher tensile strength, higher modulus, and lower elongation at break since the aromatic nature of styrene can impart rigidity to the thermosets. For a given oligomer architecture, the mechanical properties were also dependent on the functionality of the oligomers. The polymer chains were more tightly connected to each other with the increase of the crosslink density, which is a strong function of oligomer functionality. More connected network gave rise to higher modulus and lower elongation at break. Thermosets based on MAESS-86 showed higher mechanical properties, regardless of their lower functionalities. This phenomenon can be explained by the higher sucrose ring content and extra hydrogen bonding of MAESS-B6. It is impressive that plant-oil based thermosets have modulus values of 0.81-1.06 GPa, considering their high bio-renewable content.

TABLE 3

Tensile properties of MAESS-based thermosets and controls

| Formulation (weight %) | Tensile strength (MPa) | Modulus (MPa) | Elongation (%) |
|---|---|---|---|
| 100% MAESBO | 14.4 ± 1.4 | 311 ± 28 | 14.2 ± 2.2 |
| 90% MAESBO/ 10% styrene | 18.2 ± 1.2 | 548 ± 123 | 9.2 ± 0.7 |
| 80% MAESBO/ 20% styrene | 23.2 ± 1.2 | 1250 ± 120 | 5.8 ± 1.2 |
| 70% MAESBO/ 30% styrene | 33.7 ± 1.5 | 1640 ± 270 | 5.9 ± 1.1 |
| 100% MAESS-0.5 | 9.1 ± 0.7 | 406 ± 124 | 4.3 ± 0.8 |
| 90% MAESS-0.5/ 10% styrene | 15.7 ± 2.5 | 673 ± 180 | 4.5 ± 1.8 |
| 80% MAESS-0.5/ 20% styrene | 23.5 ± 1.3 | 960 ± 170 | 4.4 ± 0.9 |
| 70% MAESS-0.5/ 30% styrene | 29.5 ± 5.0 | 1240 ± 80 | 3.9 ± 0.9 |
| 100% MAESS-0.7 | 20.9 ± 1.4 | 660 ± 30 | 4.4 ± 0.6 |
| 90% MAESS-0.7/ 10% styrene | 20.9 ± 2.5 | 930 ± 50 | 2.5 ± 1.1 |
| 80% MAESS-0.7/ 20% styrene | 26.7 ± 3.2 | 1060 ± 280 | 3.1 ± 1.2 |
| 70% MAESS-0.7/ 30% styrene | 34.4 ± 5.8 | 1390 ± 210 | 3.3 ± 0.8 |
| 100% MAESS-0.8 | 17.8 ± 4.3 | 880 ± 70 | 2.7 ± 0.7 |
| 90% MAESS-0.8/ 10% styrene | 22.1 ± 3.8 | 1410 ± 140 | 3.0 ± 0.9 |
| 80% MAESS-0.8/ 20% styrene | 22.5 ± 2.7 | 1380 ± 80 | 2.6 ± 0.5 |
| 70% MAESS-0.8/ 30% styrene | 33.2 ± 5.2 | 1380 ± 70 | 2.5 ± 0.7 |
| 100% MAESS-B6-0.5 | 23.3 ± 0.6 | 810 ± 80 | 7.5 ± 0.7 |
| 90% MAESS-B6-0.5/ 10% styrene | 25.3 ± 0.4 | 920 ± 110 | 5.8 ± 1.4 |
| 80% MAESS-B6-0.5/ 20% styrene | 27.5 ± 1.0 | 1080 ± 200 | 3.6 ± 0.7 |
| 70% MAESS-B6-0.5/ 30% styrene | 40.6 ± 1.1 | 1300 ± 150 | 4.6 ± 0.9 |
| 100% MAESS-B6-0.7 | 28.3 ± 2.4 | 980 ± 100 | 4.6 ± 0.7 |
| 90% MAESS-B6-0.7/ 10% styrene | 29.3 ± 6.4 | 1070 ± 90 | 4.1 ± 0.8 |
| 80% MAESS-B6-0.7/ 20% styrene | 28.5 ± 4.2 | 1320 ± 250 | 2.8 ± 1.0 |
| 70% MAESS-B6-0.7/ 30% styrene | 37.5 ± 3.2 | 1400 ± 110 | 3.1 ± 0.5 |
| 100% MAESS-B6-0.8 | 22.0 ± 1.0 | 1060 ± 140 | 2.8 ± 0.4 |
| 90% MAESS-B6-0.8/ 10% styrene | 26.4 ± 1.2 | 1260 ± 140 | 2.8 ± 0.5 |
| 80% MAESS-B6-0.8/ 20% styrene | 28.5 ± 2.2 | 1360 ± 150 | 2.4 ± 0.7 |
| 70% MAESS-B6-0.8/ 30% styrene | 40.1 ± 5.3 | 1450 ± 80 | 2.8 ± 0.7 |

1.6.3.3 Thermogravimetric Analysis (TGA)

The thermal stability of MAESS-based thermosets was characterized via thermogravimetric analysis (TGA), and the temperatures of 5% weight loss ($T_{5\%}$) of MAESS-based thermosets were listed in Table 2. The $T_{5\%}$ values of the thermosets in this study span a range of 261-308° C. As shown in FIG. 12a, the homo-polymers based on MAESBO and MAESS showed similar thermal stability, but the homo-polymers based on MAESS-B6 were less stable than those based on MAESBO and MAESS. The lower degree of substitution for sucrose core in MAESS-B6 accounted for the poorer thermal stability of thermosets based on MAESS-B6. There was no strong correlation between the methacrylate functionality of oligomers and the thermal stability of the resulting thermosets. As shown in FIG. 12b, the styrene content had little impact on the thermal stability of thermosets based on MAESBO, MAESS and styrene. However, with the introduction of styrene as a diluent (comonomer), the thermal stability was improved for thermosets based on MAESS-B6 and styrene.

1.7 Conclusions

A series of novel bio-based, high functional methacrylated epoxidized sucrose soyate (MAESS) oligomers were prepared by the ring-open reaction between methacrylic acid and epoxidized sucrose soyate using AMC-2 as the catalyst and hydroquinone as the inhibitor. When the acid/epoxy molar ratio is kept lower than 0.8, a high conversion of methacrylic acid can be achieved. These oligomers were compatible with styrene at all ratios, and the viscosities were lower than 10 and 1 Pa·s with the addition of 20% and 30% styrene, respectively. Bio-based thermosets were then formulated using MAESS and styrene, cured via a free radical mechanism, and fully characterized in terms of gel content, thermal and mechanical properties. Compared to their counterparts based on methacrylated epoxidized soybean oil, the thermal and mechanical properties of MAESS-based thermosets were dramatically improved due to the much higher functionality and the rigidity of sucrose ring in MAESS oligomers. Without any styrene, MAESS-based thermosets possessed glass transition temperature of 63-114° C., tensile strength at break of 9.1-28.3 MPa, modulus of 406-1,060 MPa, and elongation at break of 2.7-7.5%. With the introduction of styrene as a comonomer, the glass transition temperature, tensile strength at break, and modulus were enhanced to 137° C., 40.6 MPa, 1.45 GPa, respectively. The bio-based content of these thermosets were in the range of 49.9-85.1%. Due to a combination of impressive remarkable properties and moderate to high bio-based content, MAESS-based oligomers and thermosets showed great potential in the applications of structural composite materials, replacing petroleum-based thermosets (such as unsaturated polyesters, vinyl resins, etc.). Thus, the design and preparation of high performance bio-based thermosets while maintaining high bio-renewable content may be accomplished.

Example 2

2.1 Materials

Bisphenol A diglycidylether methacrylate (Bis-GMA), the control and triethyleneglycol dimethacrylate (TEGDMA) reactive diluent, were generously donated from Esstech, Inc. in Essington, Pa. Hydroquinone was purchased from Sigma Aldrich in Milwaukee, Wis. Epoxidized Sucrose Soyate (ESS) was previously prepared at North Dakota State University Coatings and Polymeric Materials Department. AMC-2 was obtained from Rancho Cordova, Calif. Darocur 1173 (2-hydroxy-2-methyl-1-phenyl-propan-1-one) was purchased from CIBA Specialty Chemicals Corporation in Tarrytown, N.Y. No materials required further purification.

2.2 Synthesis 2.2.1 Methacrylation

Appropriate amounts of ESS (see Table 4), methacrylic acid, 2.5% hydroquinone and 1% AMC-2 were added to a three-necked 250 flask. The first neck was fitted with a nitrogen and glass holder that contained a digital thermometer set at 90° C. This was fitted with a nitrogen inlet tube. The middle neck contained a Teflon adaptor and a mechanical stirrer. The last neck was fitted with a condenser that had water going in and out. On top of the condenser, a rubber stopper had an inserted needle. The extent of methacrylation was determined by measuring the acid value. The reaction was stopped once the acid value was in the range of 5-15.

TABLE 4

Methacrylation of Sucrose Soyate materials

|  | Extent of Methacrylation | ESS | Oxirane Content | Methacrylic Acid | Hydroquinone (2.5% by weight of oil + methacrylic acid) | AMC-2 (1%) |
|---|---|---|---|---|---|---|
| MAESS_25 | 25% | 50.0 g | 0.202 mol | 40.35 g 0.051 mol | 1.36 g | 0.544 g |
| MAESS_50 | 50% | 50.1 g | 0.202 mol | 8.82 g 0.101 mol | 1.50 g | 0.60 g |
| MAESS_75 | 75% | 50.2 g | 0.202 mol | 12.98 g 0.152 mol | 1.57 g | 0.63 g |
| MAESS_90 | 90% | 50.0 g | 0.200 mol | 15.62 g 0.18 mol | 1.66 g | 0.658 g |

2.3 Nomenclature

Naming in this example was done in the following manner for the methacrylation of epoxidized sucrose soyate: MAESS_extent of methacrylation. Thus, the variation in methacrylation was 25% (MAESS_25), 50% (MAESS_50), 75% (MAES_75), and 90% (MAESS_75). Bisphenol A diglycidylether methacrylate (BisGMA) was used as the control for experiments that were run.

2.4 Characterization 2.4.1 Add Value Determination

A small amount of the methacrylated product was dissolved in 0.2-0.3 g of 50:50 by weight isopropyl alcohol and toluene mixture. Then, addition of a few drops of 1% phenolphthalein in ethanol indicator. Subsequently, the solution was titrated with standardized 0.1 N KOH. Once the color changed from light yellow to pink, the end point was achieved. Acid value was then calculated by the following equation:

$$AV = \frac{\text{vol. KOH (mL)} \times \text{NKOH} \times 56.1}{\text{resin weight (g)}}$$

2.4.2 Infrared Measurement

FTIR measurements on the control and MAESS were done by a Thermo Scientific Nicolet 8700 FTIR spectrometer. Spectra acquisitions were based on 32 scans with data spacing of 4.0 $cm^{-1}$.

2.4.3 Proton Nuclear Magnetic Resonance ($^1H$ NMR)

$^1H$ NMR measurements to portray the control and MAESS variations in methacrylations were done at 23° C. using a JOEL-ECA (400 MHz) NMR spectrometer. All measurements were made using $CDCl_3$ as solvent.

2.4.4 Gel Permeation Chromatography (GPC)

Waters 515 HPLC. Pump and 2410 Refractive Index Detector was used with a flow rate of 1.000 ml/min to determine the weight average molecular weight ($M_w$), number of average molecular weight ($M_n$), and polydispersity index (PDI) of MAESS polymers with varying percent methacrylation for 25 minutes. A small amount of the MAESS was mixed with 3 mg/ml of tetrahydrofuran in an 8 ml clear vial and vigorously shaken. This was then injected with a sterile syringe into the GPC.

2.4.5 Viscosity Determination

The viscosity of MAESS_25, MAESS_50, MAESS_75, and MAESS_90 were measured at 125° C. on an analog ICI Cone and Plate Viscometer, in accordance with ASTM D 4287-00. The viscosity of MAESS_25, MAESS_50, MAESS_75, MAESS_90, the control and varying percent reactive diluent (10%, 20%, 30%) were measured at 23° C.: using a Brookfield DV-II+Pro viscometer, in reference to ASTM D 2196-05. However, the varying viscosity of MAESS_25 was not carried out due to inadequate amount of sample.

2.5 Coating Formulations and UV Curing Conditions

The formulations of the coating consisted a control (BisGMA) or MAESS Resin (either LB1-25, LB3-50, LB8-75, and LB9-90), a solvent/reactive diluents (TEGDMA 20% by weight) to reduce viscosity, and Darocur 1173 (5% by weight) as the photo-initiator. These materials were placed in a dark amber vial and hand-mixed. Followed by application onto Q-panel (aluminum smooth finish, 0.63"×3"×6") and glass panels with a Guard Co. draw down bar, with a clearance of 5 mil. The coated panels were cured with exposure to a UV lamp (Fusion LC6B Benchtop Conveyer with an F300 UV Lamp, intensity~1180 $mW/cm^2$ by UV Power Puck® II from EIT Inc.) for 30 sec.

2.6 Coating Properties 2.6.1 Mechanical Coating Properties

First film thickness of cured coatings was measured then coating property tests were conducted. This was to ensure adequate samples for testing. The determination of coating performance tests correlated with the ASTM methods as outlaid in Table 5.

TABLE 5

Mechanical Coating properties characterization

| Specification | ASTM Methods |
|---|---|
| König Hardness | ASTM D 4366-95 |
| Pencil hardness | ASTM D 3363-00 |
| Adhesion | ASTM D 3359-97 |
| MEK double rub test | ASTM D 5402-93 |
| Impact resistance | ASTM D 2794-93 |

2.6.2 Thermogravimetric Analysis (TGA)

Q5OO TGA from TA Instrument was used to study the thermal degradation characteristic of the formulations done on coatings. Small amount of coatings (4-10 mg) were placed in a sample pan and heated from 25° C. to 800° C. under $N_2$ at a heating rate of 20° C. $min^{-1}$.

2.6.3 Differential Scanning Calorimetry (DSC)

2.6.3.1 Photo DSC

To characterize the induction time of the curing samples, a DSC 1000 from TA instrument with an auto-sampler was used. The experiment was carried out with equilibrating 5-15 mg of the coating samples at 25° C. Next, the samples were subjected to UV-light (40 $mW/cm^2$) for 5 minutes.

2.6.3.2 Standard DSC

The same DSC instrument previously mentioned was used to determine the glass transition temperature ($T_g$) on the control and MAESS samples. A thin film (4-10 mg) ran in a heat-cool-heat cycle from −70° C. to 150° C. There were heating rates of 10° C. $min^{-1}$ and cooling rates of 10° C. $min^{-1}$. Based on the second heating cycle curve, $T_g$ was measured.

2.6.4 NanoIndentation

NanoIndentation was performed to determine the mechanical properties of the control and MAESS coatings. Hysitron TI 900 was used with Quasi-Static Mode (QSM) was conducted to measure the reduced modules and indentation hardness. A Berkovich tip was used and load controlled intent, which had a 5 second load time, 5 second hold time at the maximum load of 500 µN, and a 5 second unloading time.

2.7 Results and Discussion 2.7.1 Properties of Methacrylated Epoxidized Sucrose Soyate (MAESS)

2.7.1.1 FTIR

FIG. 13 shows the FTIR spectra of MAESS_25, MAESS_50, MAESS_70, MAESS_90, and the control. The synthesis of MAESS is shown by the disappearance of 2750 $cm^{-1}$ absorption bonds (C—H of C=CH), showing the double bond is consumed during the reaction to form MAESS. Also, the weak absorption at 755 $cm^{-1}$ (C—O of C—O—C oxirane) in MAESS indicates the formation of the oxirane group.

The success of methacrylation was shown by the multiple bands of methacrylation groups: 875 $cm^{-1}$ (C—H of C=$H_2$), 995 $cm^{-1}$ (CH of monosubstituted alkene), 1025 $cm^{-1}$ (C—O of secondary alcohol), 1325 $cm^{-1}$ (C—O of esters), 1523 $cm^{-1}$ (C=O of carboxylates), 1750 $cm^{-1}$ (C—C of C=C), and 3250 $cm^{-1}$(O—H of alcohols).

2.7.1.2 $^1$H NMR

FIG. 14 shows the $^1$H NMR spectroscopy of MAESS_25, MAESS_50, MAESS_75, MAESS_90, and ESS. Because of the number of peaks in the spectroscopy, it is determined that synthesis was successful. The loss of the peak of ethylene group around 4.0 (a) and 2.4 (h) indicates MAESS was properly synthesized from ESSy. Presence of methacrylated groups appears around 6.0 (c), 5.7 (b), and 5.8 (d). An epoxy group occurs around 2.7 (e). With increased methacrylation, peak intensity increases for methacrylated groups.

2.7.2 MAESS Characterization 2.7.2.1 Gel Permeation Chromatography (GPC)

GPC values of the weight average molecular weight ($M_w$), number of average molecular weight ($M_n$), and polydispersity index (PDI) is outlined in Table 6. Overall, MAESS_75 has the largest $M_w$, $M_n$, and PDI valuesMAE-SSThe rest of the materials (MAESS_25, MAESS_50, and MAESS_55) had values that were similar, showing no real difference in the percent methacrylation.

TABLE 6

GPC data of MAESS

|  | $M_w$ | $M_n$ | PDI |
|---|---|---|---|
| MAESS_25 | 3600 | 3200 | 1.1 |
| MAESS_50 | 4100 | 3300 | 1.2 |
| MAESS_75 | 7500 | 4600 | 1.6 |
| MAESS_90 | 5300 | 3700 | 1.4 |

2.7.2.2 Viscosity 2.7.2,2.1 ICI Viscosity

The ICI Cone and Plate Viscometer measured ICI viscosity for MAESS samples. Sheer force was applied to the samples in this test in order to determine how high of a sheer viscosity the samples had. Table 7 shows the viscosity readings of MAESS_25, MAESS_50, MAESS_75, and MAESS_90 at 125° C. MAESS_75 received the highest viscosity reading.

TABLE 7

ICI cone and palate Viscosity of MAESS

|  | Viscosity (125° C.) |
|---|---|
| MAESS_25 | 1.2 |
| MAESS_50 | 1.2 |
| MAESS_75 | 2.7 |
| MAESS_90 | 2.2 |

2.7.2.2.2 Brookfield Viscosity

Brookfield viscosity showed how difficult it was for the spindle to rotate in the sample, A high RPM corresponded to a quick rotating spindle; whereas, a low RPM value meant a slow rotating spindle. This information showed that the viscosity was indirectly proportional to the RPM value. Thus, something with a high viscosity would have a low RPM value. Correlation between RPM speed and viscosity of the control and MAESS with varied percent reactive diluents is outlined in Table 8.

TABLE 8

Viscosity of the control and MAESS with variation in percent reactive diluents

|  | 0% TEGDMA | | 10% TEGDMA | | 20% TEGMA | | 30% TEGMA | |
|---|---|---|---|---|---|---|---|---|
|  | RPMs | Viscosity (Pa-S) | RPMs | Viscosity (Pa-S) | RPMs | Viscosity (Pa-S) | RPMs | Viscosity (Pa-S) |
| Control | 2 | $182e^4$ | 4 | $226e^3$ | 2.5 | $294e^3$ | 2.5 | $283e^3$ |
| MAESS_25 | 100 | 19320 | NA | NA | NA | NA | NA | NA |
| MAESS_50 | 20 | 54200 | 50 | 10200 | 50 | 10180 | 50 | 9760 |
| MAESS_75 | 5 | 92200 | 10 | 65200 | 10 | 62500 | 10 | 58800 |
| MAESS_90 | 20 | 40150 | 20 | 37700 | 20 | 25950 | 20 | 26800 |

A trend started to appear among the MAESS's that contained no reactive diluents, that with the increased methacrylation there was increased viscosity. However, MAESS_90 did not follow this trend. Instead, MAESS_90 had an increased RPM and decreased viscosity from MAESS_75, Thus, with no addition of reactive diluents, MAESS_75 has the highest viscosity. When comparing MAESS_75 to the control, the control has a larger viscosity.

With increased reactive diluent there was a decreased viscosity overall. At every percent, reactive diluent MAESS_75 was the most viscous and MAESS_60 was the least viscous. The percent reactive diluent that is most comparable to the viscosity of the control is when MAESS_75 is at 0% TEGDMA and the control is at 30% TEGDMA. Even at these points, the viscosity is still dramatically high for the control, showing that even with increased reactive diluent for MAESS_50, MAESS_75, and MAESS_90 viscosity will not be comparable to the control.

2.7.3 Coating Properties
2.7.3.1 Characteristics of Coating Properties

Coating characteristics relies greatly on the cross-linking density of the polymers, The better the cross-linking the better the coating created. In general, the percent methacrylation did not vary the coating properties dramatically. The only dramatic trend in the coating properties was from MAESS_50 to MAESS_75. Table 9 shows properties of the control and MAESS coatings.

Poor adhesion was shown by the Cross Hatch Adhesion test. VanDer Waals bonds that shrunk after rapid curing caused the poor adhesion. All values were slightly on the lower side, with MAESS_75 and the Control having the highest value (1B).

Pencil and Konig hardness followed a similar trend with having the hardest MAESS to be MAESS_75 and the weakest to be MAESS_25. Hardness usually directly relates to how brittle something is. However, impact hardness, which shows how flexible or brittle something can be, got the reverse results with the hardest methacrylation (MAESS_75) being the most flexible and the softest methacrylation (MAESS_25) to be the most brittle.

In general, MAESS_75 had the most comparable data as the control when looking at coating properties.

TABLE 9

MAESS Coating Properties

|  | MAESS_25 | MAESS_50 | MAESS_75 | MAESS_90 | Control |
|---|---|---|---|---|---|
| Average Film Thickness (µm) | 68 | 63 | 72 | 42 | 66 |
| König Hardness (s) | 14 | 17 | 107 | 52 | 206 |
| Impact Hardness (inch · lb) | <8 | 20 | 24 | 20 | <8 |
| Pencil Hardness | F | F | 6H | F | 6H |
| MEK double rub | 13 | 24 | >400 | 26 | >400 |
| Cross Hatch Adhesion | 0B | 0B | 1B | 0B | 1B |

2.7.3.2 Thermal Gravimetric Analysis (TGA)

TGA measured the weight loss/weight gain of MAESS allowing the calculation of thermal degradation, Based on the values in FIG. 15 and Table 10, percent of methacrylation did not make a significant difference in the onset of thermal degradation. The control and all of the MAESS had the most weight loss around 363° C.

TABLE 10

Onset of thermal degradation of MAESS

| | Temperature (° C.) |
|---|---|
| Control | 370 |
| MAESS_25 | 362 |
| MAESS_50 | 365 |

TABLE 10-continued

Onset of thermal degradation of MAESS

| | Temperature (° C.) |
|---|---|
| MAESS_75 | 359 |
| MAESS_90 | 361 |

2.7.3.3 DSC
2.7.3.3.1 Photo DSC

Photo DSC shows the induction time of polymerization at the highest heat flow value in FIG. 16 and Table 11. Based on the induction time of polymerization, ultraviolet curable materials are characterized effectively. MAESS_75 took the longest to begin polymerization, followed by MAESS_50, MAESS_25, MAESS_90, and the control polymerized earliest. However, because the values only slightly vary in induction time of polymerization, the variation is not important.

TABLE 11

Induction time of polymerization

| | time (min) |
|---|---|
| Control | 0.55 |
| MAESS_25 | 0.63 |
| MAESS_50 | 0.69 |
| MAESS_75 | 0.86 |

2.7.3.3.2 Standard DSC

The second heating cycle curve is where the glass transition state was measured for the control and MAESS. Table 12. shows the class transition states of the polymers, A higher glass transition temperature corresponds to a more brittle coating. Out of the MAESS with varying methacrylation percentages, MAESS_90 is the most brittle and MAESS_25 is the least brittle. The MAESS that has data closest to the control polymer is MAESS_75 (variation of 1° C.).

TABLE 12

Tg of Coatings Formulation

| | $T_g$ (° C.) |
|---|---|
| Control | −36.0 |
| MAESS_25 | −46.0 |
| MAESS_50 | −41.0 |
| MAESS_75 | −37.0 |
| MAESS_90 | −29.0 |

2.73.4 NanoIndentation

The Reduced Modulus (Table 13) measured how brittle or ductile the control and MAESS coatings were. MAESS_75 was the most brittle and MAESS_25 was the most ductile. The other coatings (MAESS_25, MAESS_50, and MAESS_90) reduced modulus values did not vary dramatically with the alteration in percent methacrylation of MAESS. The control was overwhelmingly more brittle than MAESS_75. Data outlined for Reduced Modulus is similar to Table 8 data.

TABLE 13

Reduced modulus values of control and MAESS

|  | Reduced Modulus (Gpa) |
| --- | --- |
| MAESS_25 | 0.03 |
| MAESS_50 | 0.05 |
| MAESS_75 | 0.32 |
| MAESS_90 | 1.73 |
| Control | 5.52 |

Indentation hardness (Table 14) measured how well the coatings resisted scratching or deformation. No pronounced variation in indentation hardness values was seen among MAESS_25, MAESS_50, and MAESS_90, suggesting that increased percent methacrylation did not greatly increase scratching resistance. However, MAESS_90 did show the best values for indentation hardness out of all of the MAESS compounds, the control was exponentially more scratch resistant. These findings correlate to what was discussed in Table 8.

TABLE 14

Indentation Hardness (Gpa) values of control and MAESS

|  | Indentation Hardness (Gpa) |
| --- | --- |
| MAESS_25 | 0.0023 |
| MAESS_50 | 0.0035 |
| MAESS_75 | 0.0147 |
| MAESS_90 | 0.0687 |
| Control | 0.3169 |

2.7.4 Conclusion

Synthesis of MAESS was achieved by the reaction of epoxidized sucrose soyate, methacrylic acid, hydroquinone and AMC-2. MAESS varied percent methacrylation from MAESS_25MAESS_50, MAESS_75, and MAESS_90. MAESS_25, MAESS_50, and MAESS_90 had insignificant distinction in the coating properties when compared to the control (Bis-GMsA). Whereas, MAESS_75 was the most comparable to the control's coating characteristics.

The claimed invention is:

1. A polyfunctional bio-based methacrylate resin which is the reaction product of:
   a) at least one polyfunctional bio-based epoxy resin, which is the reaction product of:
      a1) sucrose; and
      a2) an ethylenically unsaturated fatty acid, and, optionally, a saturated fatty acid,
      wherein at least one ethylenically unsaturated group of the ethylenically unsaturated fatty acid is oxidized to an epoxy group;
   b) at least one ethylenically unsaturated acid selected from methacrylic acid, acrylic acid, and crotonic acid;
   c) optionally, at least one catalyst; and
   d) optionally, at least one inhibitor,
   wherein at least one epoxide group of the polyfunctional bio-based epoxy resin is esterified by at least one ethylenically unsaturated acid.

2. The polyfunctional bio-based methacrylate resin of claim 1, wherein the polyfunctional bio-based epoxy resin is epoxidized sucrose soyate.

3. The polyfunctional bio-based methacrylate resin of claim 1, wherein the epoxide groups of the polyfunctional bio-based epoxy resin are substantially esterified by the ethylenically unsaturated acid.

4. The polyfunctional bio-based methacrylate resin of claim 1, wherein a fraction of the epoxide groups of the polyfunctional bio-based epoxy resin is esterified by the ethylenically unsaturated acid.

5. The polyfunctional bio-based methacrylate resin of claim 1, wherein the molar ratio of the ethylenically unsaturated acid to the epoxide groups of the polyfunctional bio-based epoxy resin ranges from 0.1 to 1.0.

6. The polyfunctional bio-based methacrylate resin of claim 1, wherein said at least one catalyst is a curing catalyst.

7. The polyfunctional bio-based methacrylate resin of claim 1, wherein said at least one catalyst is present in an amount ranging from 0.01 to 5 percent of the total weight of the polyfunctional bio-based methacrylate resin.

8. The polyfunctional bio-based methacrylate resin of claim 1, wherein said at least one inhibitor is present in an amount ranging from 0.01% to 2.5% of the total weight of the polyfunctional bio-based methacrylate resin.

9. The polyfunctional bio-based methacrylate resin of claim 1, wherein the ethylenically unsaturated fatty acid, and, optionally, a saturated fatty acid is a vegetable or seed oil fatty acid.

10. The polyfunctional bio-based methacrylate resin of claim 9, wherein the vegetable or seed oil fatty acid is selected from the group consisting of corn oil, castor oil, soybean oil, safflower oil, sunflower oil, linseed oil, tall oil fatty acid, tung oil, vernonia oil, and mixtures thereof.

11. The polyfunctional bio-based methacrylate resin of claim 1, wherein the ethylenically unsaturated acid is methacrylic acid.

12. The polyfunctional bio-based methacrylate resin of claim 1, wherein the at least one catalyst is AMC-2 and the at least one inhibitor is hydroquinone.

13. A curable composition comprising:
   a) the polyfunctional bio-based methacrylate resin of claim 1;
   b) optionally, at least one diluent;
   c) optionally, at least one initiator;
   d) optionally, at least one solvent; and
   e) optionally, at least one pigment.

14. The curable composition of claim 13, wherein:
   a) the polyfunctional bio-based epoxy resin of the polyfunctional bio-based methacrylate resin is epoxidized sucrose soyate, and
   b) the ethylenically unsaturated acid of the polyfunctional bio-based methacrylate resin is methacrylic acid.

15. The curable composition of claim 13, wherein the diluent is present in an amount ranging from 5 to 80 percent of the total weight of the curable composition.

16. The curable composition of claim 13, wherein the initiator is a thermally activated free radical initiator.

17. The curable composition of claim 16, wherein the thermally activated free radical initiator is selected from a peroxide, an azo initiator, or mixtures thereof.

18. The curable composition of claim 17, wherein the peroxide is selected from the group consisting of dialkyl peroxides, diacyl peroxides, diperoxyketals, hydroperoxides, ketone peroxides, peroxydicarbonates, and peroxyesters, and the azo initiator is selected from the group consisting of 2,2'-azobis(2,4-dimethyl-pentanenitrile), 2,2'-azobis(2-isobutyronitrile), 2,2'-azobis(2-methylbutyronitrile), and 1,1'-azodicyclohexanecarbonitrile.

19. The curable composition of claim 13, wherein the initiator is present in an amount ranging from 0.5 to 15 percent of the total weight of the curable composition.

20. The curable composition of claim 13, wherein said curable composition is cured by free radical polymerization, cured by contacting said curable composition with UV light, or thermally cured.

21. A composite comprising the curable composition of claim 13 and at least one reinforcing material.

22. An object coated with the curable composition of claim 13.

23. The object of claim 22, wherein said object is a dental resin composite.

24. The curable composition of claim 13, wherein the diluent is selected from the group consisting of styrene, bisphenol A diglycidylether methacrylate (Bis-GMA), triethyleneglycol dimethacrylate (TEGDMA), isodecyl acrylate, isodecyl methacrylate, 2-hydroxyethyl acrylate, 2-hydroxyethyl methacrylate, butyl acrylate, butyl methacrylate, 2-ethylhexyl acrylate, 2-ethylhexyl methacrylate, 1,6-hexanediol diacrylate, 1,6-hexanediol dimethacrylate, trimethylolpropane triacrylate, trimethylolpropane trimethacrylate, pentaerythritol tetraacrylate, pentaerythritol tetramethacrylate, ethoxylated trimethylolpropane triacrylate, ethoxylated trimethylolpropane trimethacrylate, acrylated epoxidized linseed oil, methacrylated epoxidized linseed oil, acrylated epoxidized soybean oil, and methacrylated epoxidized soybean oil.

25. The curable composition of claim 24, wherein the diluent is styrene.

26. A resin composition made by methacrylating at least one epoxide group of a polyfunctional bio-based epoxy resin to at least one methacrylate group,
    wherein the polyfunctional bio-based epoxy resin is the reaction product of:
    a1) sucrose; and
    a2) an ethylenically unsaturated fatty acid, and, optionally, a saturated fatty acid,
    wherein at least one ethylenically unsaturated group of the ethylenically unsaturated fatty acid is oxidized to an epoxy group.

27. The resin composition of claim 26, wherein the polyfunctional bio-based epoxy resin is epoxidized sucrose soyate.

28. A method of making a resin composition, comprising the step of methacrylating at least one epoxide group of a polyfunctional bio-based epoxy resin to at least one methacrylate group,
    wherein the polyfunctional bio-based epoxy resin is the reaction product of:
    a1) sucrose; and
    a2) an ethylenically unsaturated fatty acid, and, optionally, a saturated fatty acid,
    wherein at least one ethylenically unsaturated group of the ethylenically unsaturated fatty acid is oxidized to an epoxy group.

29. The method of making the resin composition of claim 28, wherein the polyfunctional bio-based epoxy resin is epoxidized sucrose soyate.

\* \* \* \* \*